United States Patent
Kunieda

(10) Patent No.: US 11,627,227 B2
(45) Date of Patent: Apr. 11, 2023

(54) IMAGE PROCESSING APPARATUS, IMAGE PROCESSING METHOD, AND STORAGE MEDIUM

(71) Applicant: CANON KABUSHIKI KAISHA, Tokyo (JP)

(72) Inventor: Hiroyasu Kunieda, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/851,134

(22) Filed: Apr. 17, 2020

(65) Prior Publication Data

US 2020/0336608 A1 Oct. 22, 2020

(30) Foreign Application Priority Data

Apr. 17, 2019 (JP) .............................. JP2019-078785

(51) Int. Cl.
*H04N 1/00* (2006.01)
(52) U.S. Cl.
CPC ................................ *H04N 1/00196* (2013.01)
(58) Field of Classification Search
CPC .................................................. H04N 1/00196
See application file for complete search history.

(56) References Cited

U.S. PATENT DOCUMENTS

| | | | | |
|---|---|---|---|---|
| 6,028,603 A * | 2/2000 | Wang | ...................... | G06F 16/54 715/776 |
| 6,097,389 A * | 8/2000 | Morris | .................. | G06F 3/0483 715/838 |
| 7,609,913 B2 * | 10/2009 | Watanabe | .......... | H04N 1/00453 358/1.18 |
| 8,024,658 B1 * | 9/2011 | Fagans | ............... | H04N 1/00196 715/730 |
| 8,078,963 B1 * | 12/2011 | Rosner | .................. | G06F 40/186 715/255 |
| 8,555,154 B2 * | 10/2013 | Chen | .................... | H04N 1/0045 715/230 |
| 8,605,323 B2 * | 12/2013 | Gaash | ..................... | G06F 3/125 358/1.18 |
| 9,081,782 B2 * | 7/2015 | Lynton | ................ | G06F 16/4393 |
| 9,189,681 B2 | 11/2015 | Kunieda et al. | | |
| 9,214,027 B2 | 12/2015 | Sumi et al. | | |
| 9,219,830 B1 * | 12/2015 | Ciorba | ............... | H04N 1/00177 |
| 9,275,270 B2 | 3/2016 | Suwa et al. | | |
| 9,288,339 B2 * | 3/2016 | Kaneko | ................ | H04N 1/3875 |

(Continued)

FOREIGN PATENT DOCUMENTS

JP 2015-114920 A 6/2015

OTHER PUBLICATIONS

Joe Geigel, Using Genetic Algorithms for Album Page Layouts, 2003, IEEE Computer Society, pp. 16-26 (Year: 2003).*

*Primary Examiner* — Daeho D Song
(74) *Attorney, Agent, or Firm* — Venable LLP

(57) ABSTRACT

The technology of the present disclosure includes: displaying album data including an existing page in which a plurality of images are arranged; adding an additional page to the album data; laying out a plurality of image data for the additional page, the plurality of image data including image data selected by a user; and changing arrangement of a plurality of image data in the existing page, based on a layout result of the plurality of image data for the additional page and a layout result of the plurality of image data in the existing page.

14 Claims, 27 Drawing Sheets

(56) References Cited

U.S. PATENT DOCUMENTS

| | | | |
|---|---|---|---|
| 9,294,634 B2* | 3/2016 | Fagans | H04N 1/00196 |
| 9,325,869 B2* | 4/2016 | Nagasaka | H04N 1/00458 |
| 9,594,534 B2 | 3/2017 | Sasaki et al. | |
| 10,013,395 B2 | 7/2018 | Kajiwara et al. | |
| 10,115,216 B2* | 10/2018 | Ishida | G06T 1/0007 |
| 10,275,652 B2 | 4/2019 | Yamamoto et al. | |
| 10,290,135 B2 | 5/2019 | Mizoguchi et al. | |
| 10,567,601 B2* | 2/2020 | Takeuchi | H04N 1/00196 |
| 10,607,384 B2* | 3/2020 | Tsukagoshi | G06K 9/6221 |
| 11,188,509 B2* | 11/2021 | Ben-Aharon | G06F 40/186 |
| 2005/0220366 A1* | 10/2005 | Watanabe | H04N 1/00461 348/231.2 |
| 2005/0243381 A1* | 11/2005 | Hill | H04N 1/00244 358/1.15 |
| 2006/0103891 A1* | 5/2006 | Atkins | H04N 1/00196 358/450 |
| 2009/0116752 A1* | 5/2009 | Isomura | G06F 16/58 382/224 |
| 2009/0248703 A1* | 10/2009 | Tsukagoshi | G06F 16/58 |
| 2010/0017704 A1* | 1/2010 | Jaffe | G06Q 10/107 715/243 |
| 2010/0037128 A1* | 2/2010 | Reid | G06T 3/00 715/224 |
| 2010/0164992 A1* | 7/2010 | Akiya | H04N 1/00461 345/641 |
| 2011/0292073 A1* | 12/2011 | Reid | G06F 16/54 345/619 |
| 2011/0296326 A1* | 12/2011 | Reid | G06T 11/00 715/764 |
| 2012/0017154 A1* | 1/2012 | Fagans | H04N 1/00164 715/730 |
| 2012/0038664 A1* | 2/2012 | Sheasby | G06T 11/60 345/629 |
| 2012/0109776 A1* | 5/2012 | Fagans | H04N 1/00196 705/26.5 |
| 2012/0151332 A1* | 6/2012 | Kaneko | H04N 1/00196 715/253 |
| 2012/0321223 A1* | 12/2012 | Nagasaka | H04N 1/00448 382/305 |
| 2013/0124980 A1* | 5/2013 | Hudson | G06T 11/60 715/779 |
| 2013/0239030 A1* | 9/2013 | Cunningham | H04N 1/00474 715/764 |
| 2013/0239049 A1* | 9/2013 | Perrodin | H04N 1/00453 715/781 |
| 2014/0010415 A1* | 1/2014 | Kunieda | G06V 40/172 382/118 |
| 2014/0010450 A1* | 1/2014 | Suwa | G06V 40/171 382/173 |
| 2014/0010451 A1* | 1/2014 | Sumi | G06T 11/60 382/173 |
| 2014/0013213 A1* | 1/2014 | Kajiwara | G06F 40/106 715/243 |
| 2014/0079324 A1* | 3/2014 | Ishige | G06F 16/50 382/224 |
| 2014/0111516 A1* | 4/2014 | Hall | G06T 11/60 345/428 |
| 2015/0169944 A1* | 6/2015 | Gotohda | G06F 3/0483 382/118 |
| 2015/0370761 A1* | 12/2015 | Harrod | G06F 40/114 715/251 |
| 2016/0062716 A1* | 3/2016 | Sasaki | H04N 1/00167 358/1.15 |
| 2016/0092091 A1* | 3/2016 | Hanson | G06F 3/04886 715/763 |
| 2016/0139761 A1* | 5/2016 | Grosz | H04N 1/00145 715/769 |
| 2016/0371312 A1* | 12/2016 | Ben-Aharon | G06F 8/38 |
| 2017/0039427 A1* | 2/2017 | Yamamoto | G06V 40/161 |
| 2017/0039746 A1* | 2/2017 | Mizoguchi | G06V 10/762 |
| 2017/0039747 A1* | 2/2017 | Ishida | G06T 11/60 |
| 2017/0186201 A1* | 6/2017 | Obayashi | G06V 20/35 |
| 2017/0315969 A1* | 11/2017 | Ben-Aharon | G06F 40/106 |
| 2018/0165538 A1* | 6/2018 | Iguchi | G06V 20/35 |
| 2018/0167521 A1* | 6/2018 | Iguchi | H04N 1/00413 |
| 2018/0167522 A1* | 6/2018 | Kunieda | G06K 9/6232 |
| 2018/0218527 A1* | 8/2018 | Kunieda | H04N 1/00196 |
| 2018/0268520 A1* | 9/2018 | Kunieda | G06T 11/60 |
| 2018/0300361 A1* | 10/2018 | Ben-Aharon | G06F 40/143 |
| 2019/0116273 A1* | 4/2019 | Takeuchi | H04N 1/00461 |
| 2019/0325627 A1* | 10/2019 | Kunieda | G06T 11/60 |
| 2019/0327367 A1* | 10/2019 | Obayashi | H04N 1/00167 |
| 2020/0280640 A1* | 9/2020 | Yamada | H04N 1/00196 |
| 2020/0336607 A1* | 10/2020 | Kunieda | G06V 40/174 |

\* cited by examiner

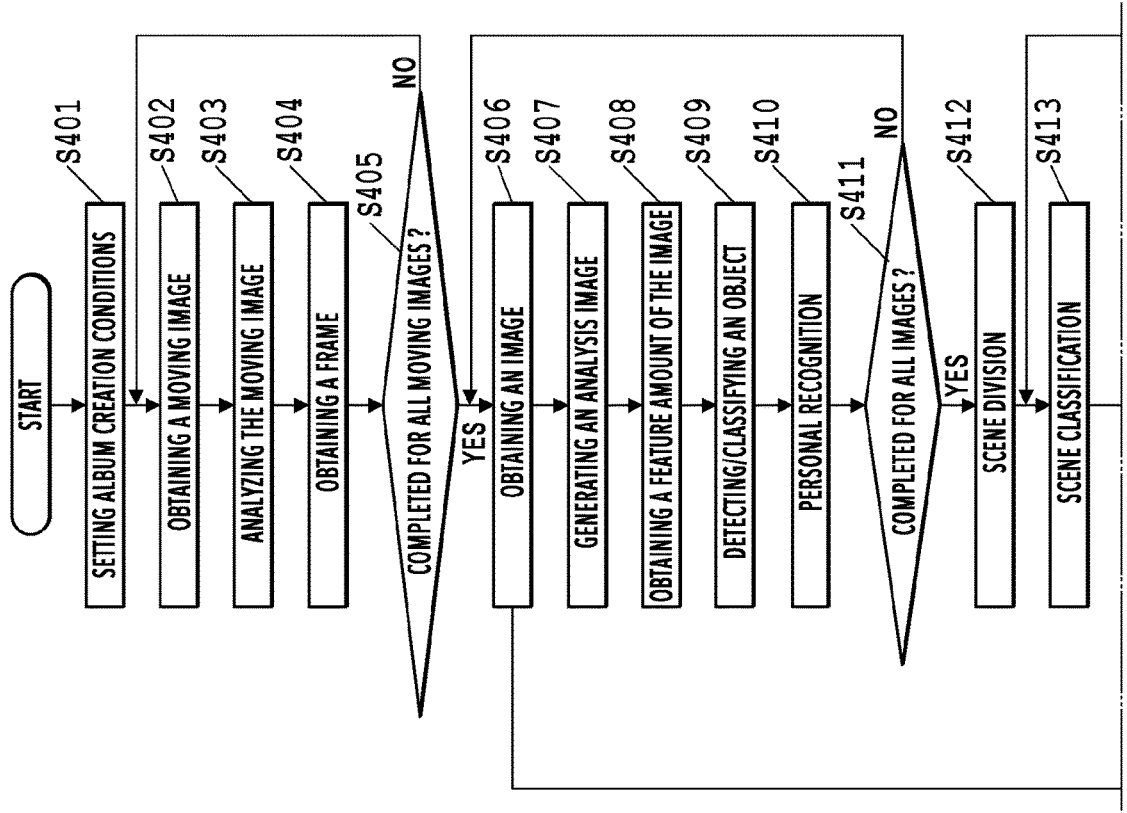

| IMAGE ID | IMAGE-CAPTURING DATE AND TIME | IMAGE TYPE | FOCUS | OBJECT CLASSIFICATION ||||||| 
| | | | | TOP1 || TOP2 || TOP3 ||
| | | | | CATEGORY | RELIABILITY | CATEGORY | RELIABILITY | CATEGORY | RELIABILITY |
|---|---|---|---|---|---|---|---|---|---|
| 1 | 2015/7/1 10h11m12s | STILL IMAGE | ○ | PEOPLE | 90 | — | — | — | — |
| 2 | 2015/7/1 10h12m30s | MOVING IMAGE | ○ | PEOPLE | 80 | ANIMALS | 40 | — | — |
| 3 | 2015/7/1 10h15m54s | SNS | | ANIMALS | 70 | PEOPLE | 10 | FOODS | 5 |
| ... | ... | ... | | ... | ... | ... | ... | ... | ... |

| NUMBER OF FACES | INDIVIDUAL ID ||||||||
| | 1 ||| 2 ||| 3 ||
| | UPPER LEFT POSITION | LOWER RIGHT POSITION | UPPER LEFT POSITION | LOWER RIGHT POSITION | UPPER LEFT POSITION | LOWER RIGHT POSITION | UPPER LEFT POSITION | LOWER RIGHT POSITION |
|---|---|---|---|---|---|---|---|---|
| 6 | 40,40 | 65,65 | 90,40 | 115,65 | 10,20 | 25,35 | ... | ... |
| 2 | 50,100 | 100,150 | 150,125 | 190,165 | 150,125 | 190,165 | — | ... |
| 0 | — | — | — | — | — | — | — | ... |
| ... | ... | ... | ... | ... | ... | ... | ... | ... |

FIG.5

| SCENE | IMAGE-CAPTURING PERIOD (HOURS) | | NUMBER OF CAPTURED IMAGES (IMAGES) | | NUMBER OF PEOPLE IN CAPTURED IMAGE (PEOPLE) | |
|---|---|---|---|---|---|---|
| | AVERAGE | STANDARD DEVIATION | AVERAGE | STANDARD DEVIATION | AVERAGE | STANDARD DEVIATION |
| TRAVEL | 33.221 | 4.778 | 324.857 | 393.691 | 1.506 | 0.256 |
| DAILY LIFE | 3.336 | 4.671 | 54.892 | 108.805 | 1.465 | 0.974 |
| CEREMONY | 4.635 | 1.532 | 165.457 | 71.055 | 2.547 | 0.527 |

| SCENE | CHARACTERISTIC OF IMAGE FOR MAIN-SLOT | CHARACTERISTIC OF IMAGE FOR SUB-SLOT |
|---|---|---|
| TRAVEL | LONG SHOT IMAGE INCLUDING PERSON AND LANDSCAPE | IMAGE OF CLOSE-UP FACE OR SIDE FACE |
| DAILY LIFE | IMAGE OF CLOSE-UP FACE OR SIDE FACE | LONG SHOT IMAGE INCLUDING PERSON AND LANDSCAPE |
| CEREMONY | IMAGE OF TWO PEOPLE BEING CLOSE FROM EACH OTHER | IMAGE OF LARGE NUMBER OF PEOPLE |

FIG.8B

| IMAGE ID | SCORE (MAX: 50 POINTS) | |
|---|---|---|
| | MAIN-SLOT (POINT) | SUB-SLOT (POINT) |
| 1 | 20 | 40 |
| 2 | 45 | 10 |
| 3 | 10 | 20 |
| ... | ... | ... |

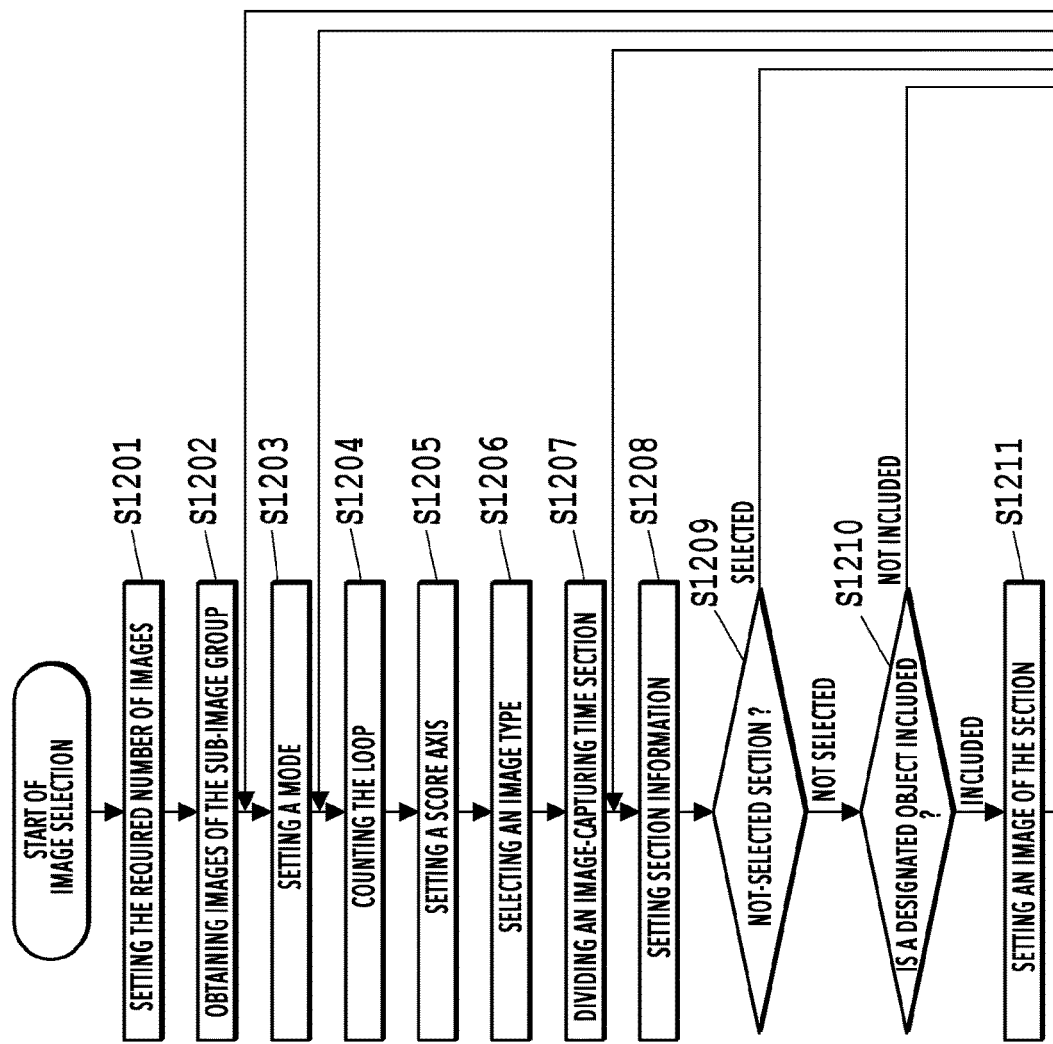

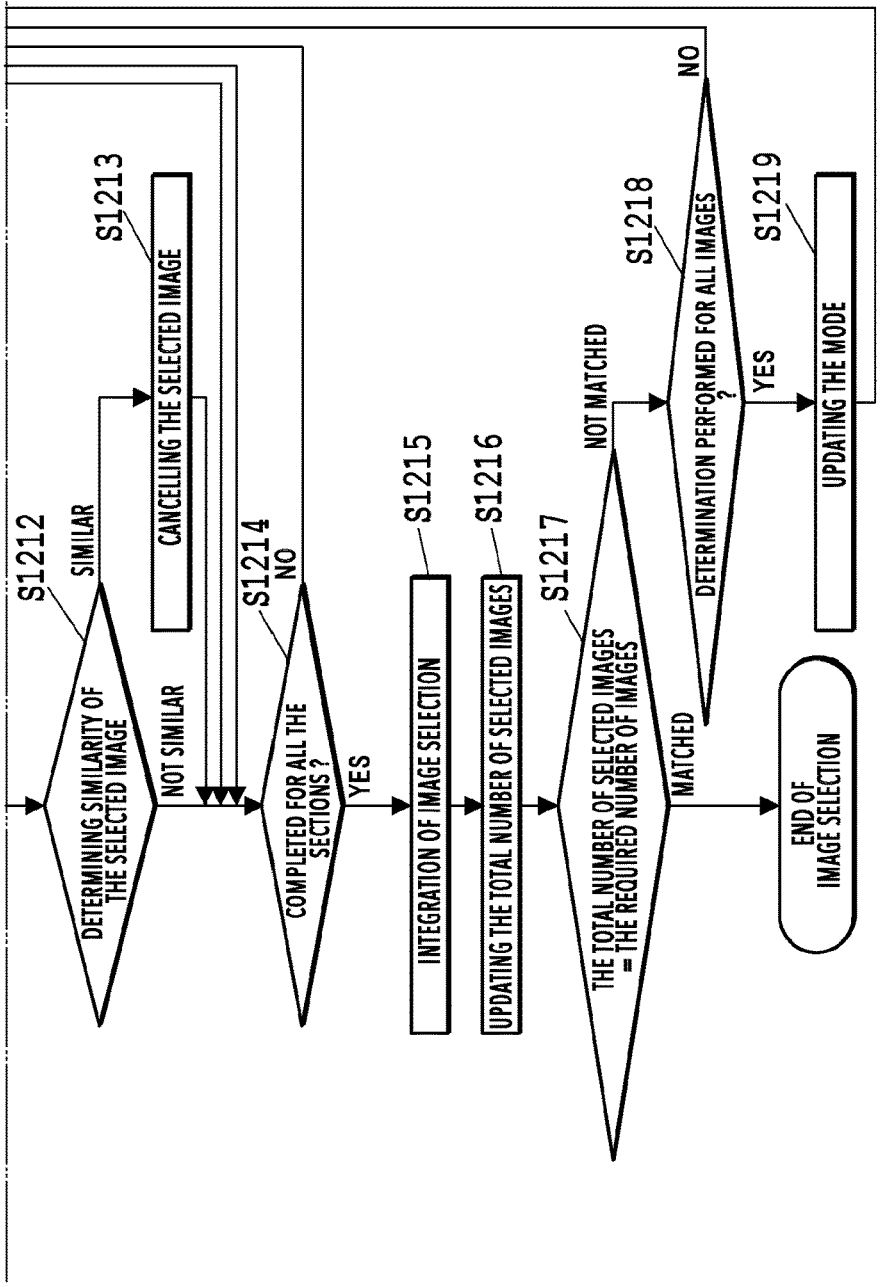

IMAGE PROCESSING APPARATUS, IMAGE PROCESSING METHOD, AND STORAGE MEDIUM

BACKGROUND OF THE INVENTION

Field of the Invention

The present disclosure relates to a technology for creating an album.

Description of the Related Art

In addition to spread of digital cameras, with spread of smart devices and improvement in camera quality of smart devices in recent years, there is a rapid increase in the number of photographs captured by a user. As a method of compiling photographs, there has been a suggestion of a photo book in which photographs are digitally processed and arranged. Since photographs are digitally processed, editing can be done on a personal computer, etc.

In Japanese Patent Laid-Open No. 2015-114920, a method for creating an electronic album is proposed. In the method, images are grouped based on additional information attached to the images, and only groups whose importance level is high are analyzed for image evaluation, then images whose evaluation value is equal to or greater than a predetermined value are used for creating the album.

However, in Japanese Patent Laid-Open No. 2015-114920 where images are divided into groups and only important groups are evaluated in order to utilize images with a high score, in a case where a user manually adds a page later, it may not be possible to adjust existing pages other than the additional page. As a result, a layout result as desired by the user may not be obtained.

SUMMARY OF THE INVENTION

The technology of the present disclosure is an image processing apparatus including: a display control unit configured to display album data including an existing page in which a plurality of images are arranged; an adding unit configured to add an additional page to the album data; a layout unit configured to lay out a plurality of image data for the additional page, the plurality of image data including image data selected by a user; and a changing unit configured to change arrangement of a plurality of image data in the existing page, based on a layout result of the plurality of image data for the additional page and a layout result of the plurality of image data in the existing page.

Further features of the present invention will become apparent from the following description of exemplary embodiments with reference to the attached drawings.

BRIEF DESCRIPTION OF THE DRAWINGS

FIG. 2 is a diagram representing a relationship between FIGS. 2A and 2B;

FIG. 4 is a diagram representing a relationship between FIGS. 4A and 4B;

FIG. 4A is a diagram of a processing flow of an automatic layout according to the present invention;

FIG. 5 is a diagram for explaining image analysis information according to the present invention;

FIG. 7 is a diagram for explaining scene classification according to the present invention;

FIG. 8A is a diagram for explaining image scoring according to the present invention;

FIG. 8B is a diagram for explaining image scoring according to the present invention;

FIG. 12 is a diagram representing a relationship between FIGS. 12A and 12B;

FIG. 12A is a diagram for explaining a detailed flow of image selection according to the present invention;

FIG. 12B is a diagram for explaining a detailed flow of image selection according to the present invention;

DESCRIPTION OF THE EMBODIMENTS

Embodiment 1

Hereinafter, a detailed explanation is given of embodiments of the present invention with reference to the drawings.

In the present embodiment, an explanation is given with the example of a method in which an application (hereinafter may be referred to as an "app") for creating an album is operated by an image processing apparatus, so as to automatically generate a layout.

Figure 1:
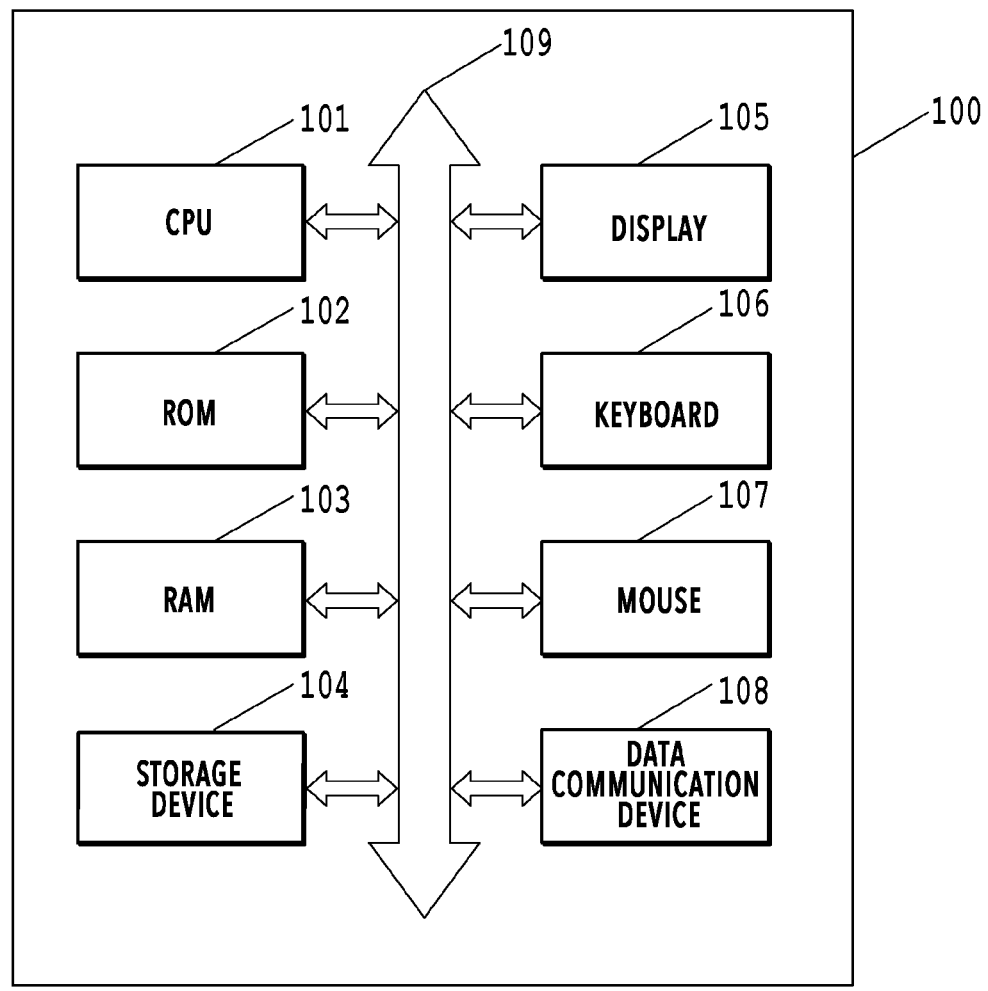
FIG. 1 is a block diagram of hardware that is able to execute an application according to the present invention.

FIG. 1 is a block diagram for explaining a hardware configuration of the image processing apparatus according to the present invention. Examples of the image processing apparatus include a PC, a smartphone, or the like. In the present embodiment, it is assumed that the image processing apparatus is a PC.

In FIG. 1, the image processing apparatus 100 includes a CPU 101, a ROM 102, a RAM 103, a storage device 104, a display 105, a keyboard 106, a mouse 107, and a data communication device 108, which are mutually connected via a data bus 109.

The CPU (Central Processing Unit/Processor) 101 is a system control unit, which entirely controls the image processing apparatus 100. Further, the CPU 101 executes the image processing method, which is explained in the present embodiment, according to a program. Note that, although there is one CPU in the drawing, the number of CPUs is not limited to one. That is, multiple CPUs may be included.

The ROM 102 stores a program to be executed by the CPU 101. The RAM 103 provides a memory for temporarily storing various kinds of information in a case where the CPU 101 executes a program. The storage device (SSD, HDD, or the like) 104 is a storage medium for storing, for example, a database in which image files, processing results of image analysis, or the like, are held. In the present embodiment, the storage device 104 stores the application program for creating an album, which is described in detail later.

The display 105 is a device that presents a UI (user interface) of the present embodiment, a layout result of an image, etc., for the user. The display 105 may have a touch sensor function. The keyboard 106 is one of the input devices, which is used for inputting given information on the UI displayed on the display 105, for example. In the present embodiment, the number of double-page spreads of an album is input via the keyboard 106. The mouse 107 is one of the input devices, which is used for selecting or clicking a button on the UI displayed on the display 105, for example.

The data communication device 108 is a device for communicating with an external apparatus such as a printer or a server. For example, after album data is generated by the processing described later, the user can instruct for printing of the album by use of the album creation application. As a result, the album data generated by the album creation application is transmitted to a printer or a server connected to the PC via the data communication device 108. Then, by use of a printer connected to the image processing apparatus 100, the album based on the album data is printed. Furthermore, the album data transmitted to a server may be printed by use of a printer connected to the server.

The data bus 109 connects the above-described units (102 through 108) and the CPU 101.

Figure 2A:
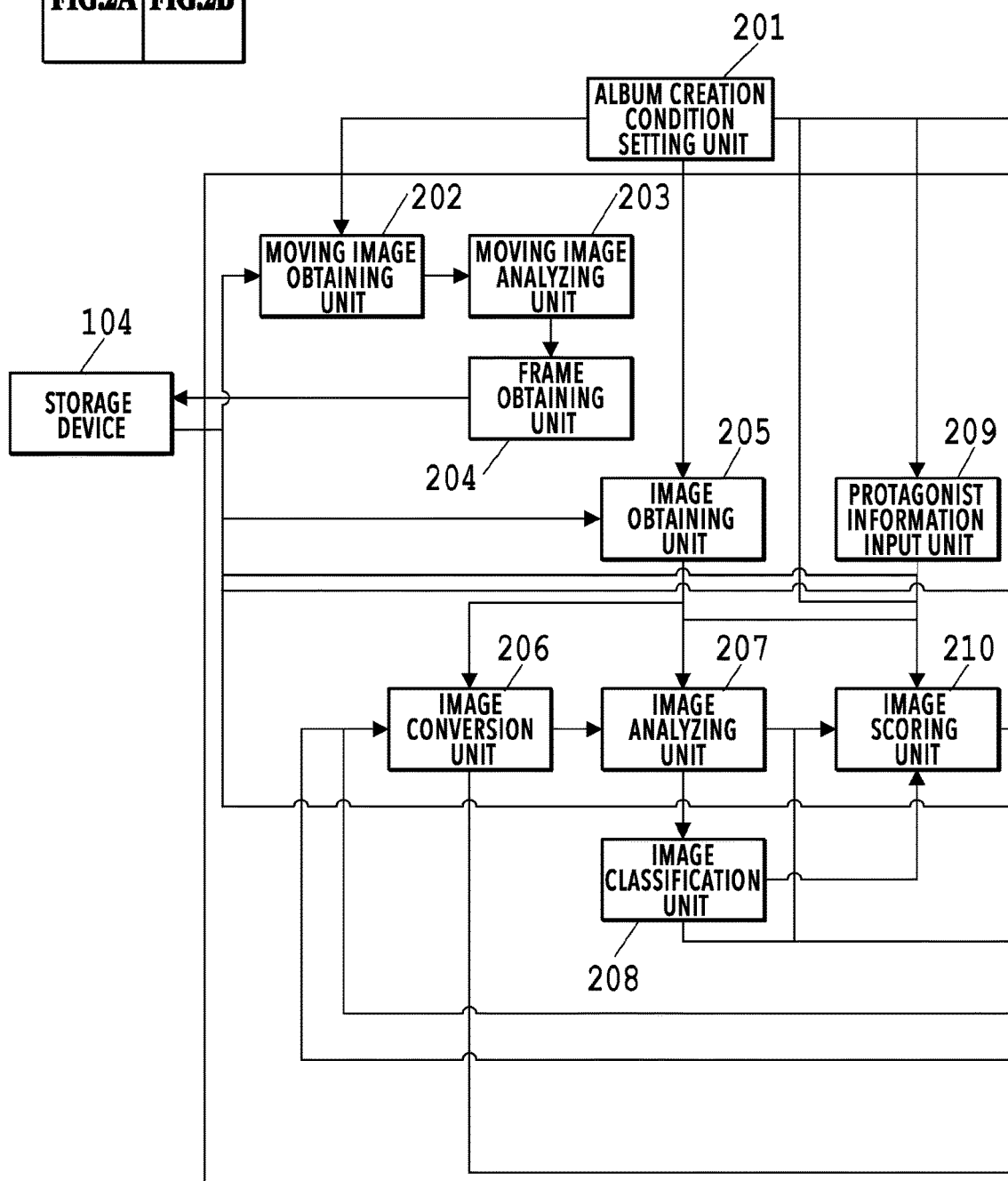
FIG. 2A is a block diagram of software of the application according to the present invention.
Figure 2B:
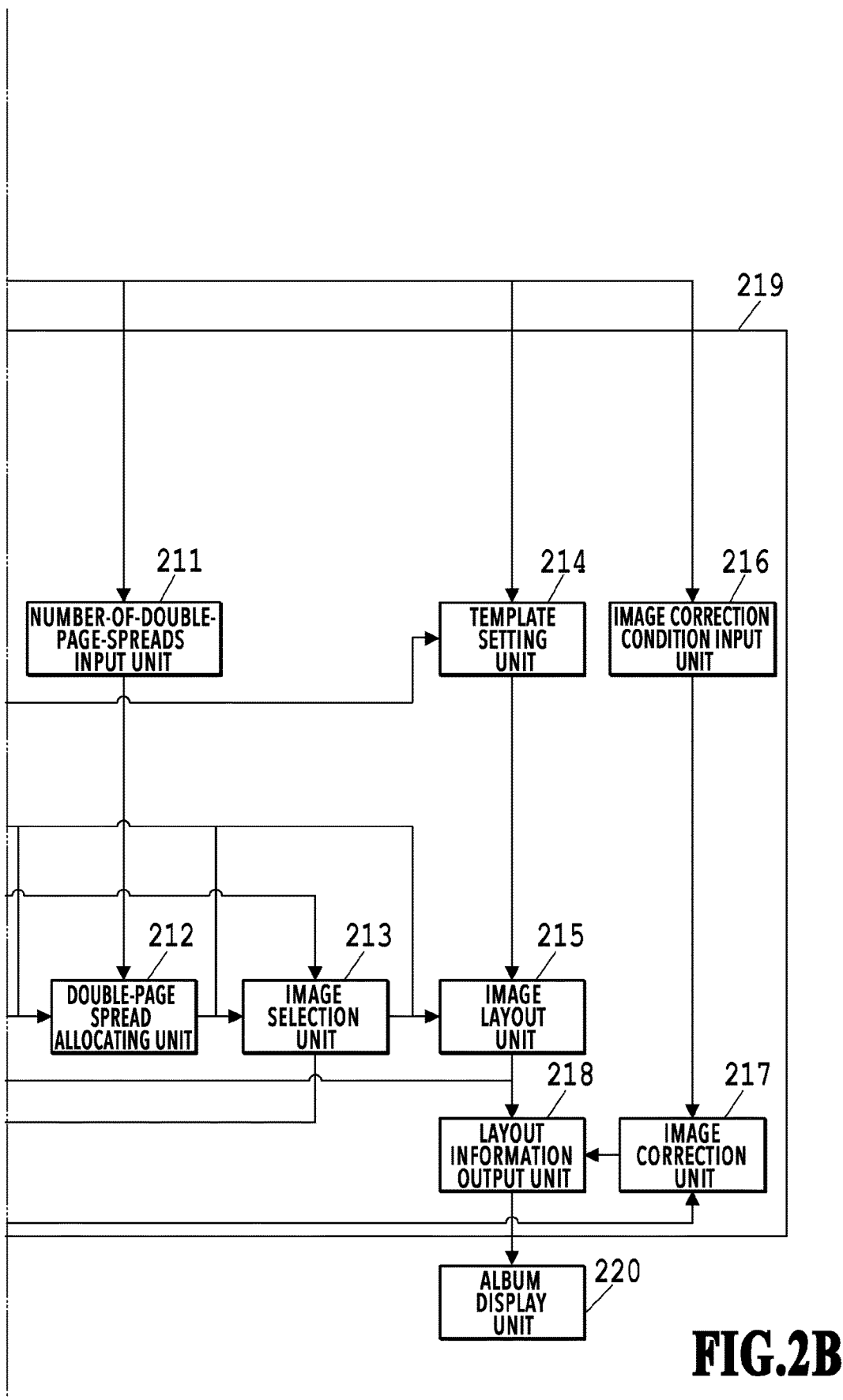
FIG. 2B is a block diagram of software of the application according to the present invention.

FIG. 2 is a block diagram for explaining the software configuration of the album creation application according to the present invention. In the present embodiment, the album creation application stored in the storage device 104 is launched in a case where the user double-clicks the application icon displayed on the display 105 using the mouse 107. Although the album creation application has various functions, an explanation is particularly given of the automatic layout function provided by the automatic layout processing unit 219 in the present embodiment.

As shown in FIG. 2, the application includes the album creation condition setting unit 201, the automatic layout processing unit 219, and the album display unit 220. The automatic layout function is a function for classifying or selecting a captured photograph, based on the contents and attributes thereof, for a layout of the photograph, so as to generate album data to be displayed on the display 105.

The album creation condition setting unit 201 designates an album creation condition for the automatic layout processing unit 219 according to an UI operation by the user using the mouse 107, etc. In the present embodiment, it is assumed that the following items can be set as an album creation condition. The album creation conditions that can be set include: a protagonist; the number of double-page spreads; the type of template; the mode of album creation; whether or not to perform image correction; the number of photographs in a double-page spread, which is for adjusting the number of images to be arranged in a double-page spread of an album; and designation of a product material, which is for designating the product material for the created album. An image and a moving image may be designated by use of attribute information or attached information of specific image data, such as the image-capturing date and time, or may be designated based on the configuration of a file system including the image and the moving image, such as designation of a device or a directory. Note that, for example, a double-page spread corresponds to one display window in a case where a double-page spread is displayed, and a double-page spread corresponds to a pair of pages adjacent to each other, which are printed on different sheets, in a case where a double-page spread is printed.

The moving image obtaining unit 202 obtains a moving image group (moving image data group) designated by the album creation condition setting unit 201 from the storage device 104. Here, the moving image group refers to moving image data group stored in a folder designated in the below-described folder selecting button 303 of FIG. 3. The obtained moving image data is decompressed from a compressed state by use of a moving image decoder, or the like, which is provided in the OS as a standard, so that the obtained moving image data can be analyzed.

The moving image analyzing unit 203 analyzes moving image data obtained by the moving image obtaining unit 202. The moving image analyzing unit 203 cuts out continuous frames from a moving image and calculates the difference amounts between a target frame and the previous and following frames thereof. In a case where the difference amounts are large, it is determined that the amount of motion is large in the frames because the target frame and the previous and following frames thereof are not similar. In a case where the difference amounts are small, it is determined that the amount of motion is small in the frames because that series of frames are similar. As for the amount of motion, it is also possible to utilize a motion vector used in the moving image format, other than such difference between frames as described above.

Then, the moving image analyzing unit 203 selects a frame to be an analysis target, based on such a determined amount of motion as described above. Based on the magnitude of the amount of motion, a frame can be classified into a moving section or a not-moving section. In a section determined to have a large amount of motion, the interval of frames to be analysis targets is set to be short, and, in a section determined to have a small amount of motion, the interval of frames to be analysis targets is set to be long. For example, in a section having a large amount of motion, a frame is set as an analysis target at the interval of five frames, and, in a section having a small amount of motion, the first, last, and middle frames are set as analysis targets.

Furthermore, the moving image analyzing unit 203 performs an analysis process to a frame that has been set as an analysis target. Items to be analyzed include: detection of an object to be utilized for a layout, such as a face or an animal; detection of the size of an object; detection of a smile regarding a face; detection of a closed eye; detection of blur and out-of-focus; and detection of brightness of the image as a whole. Then, scoring is performed by calculating the score of a frame according to the result of each determination item in such a way as described below.

Here, an explanation is given of detection of an object, which is performed by the moving image analyzing unit 203. For example, the moving image analyzing unit 203 sets a higher score for a frame including an object corresponding to the protagonist (that is, the face of the protagonist) that has been set as an album creation condition, compared to an image that does not include an object corresponding to the protagonist. Next, an explanation is given of size determination, which is performed by the moving image analyzing unit 203. As the size determination of an object, the moving image analyzing unit 203 sets a high score for a detected object in a case where the size of the object is large. In addition, the moving image analyzing unit 203 sets a high score for a frame with a large number of faces determined as a smile in smile determination and a large number of faces determined not to have closed eyes in close-eye determination. Furthermore, in determination of blur and out-of-focus, an edge amount of an image is calculated by use of the Laplacian filter, so that the moving image analyzing unit 203 sets a higher score for a frame with a larger edge amount. Moreover, regarding the brightness of the image as a whole, the moving image analyzing unit 203 sets a high score for a frame of which the average luminance of the image is equal to or greater than a predetermined value.

The moving image analyzing unit 203 ultimately calculates a total score, which is the total sum of the scores for the respective items. In addition, the area for which determination of blur and out-of-focus is performed may be changed according to a determined amount of motion. For example, in a case of pursuing a moving object while capturing a moving image, the object is clearly captured but the background is blurred, and, thus, the image as a whole is blurred. Therefore, in such a case where an amount of motion is large, a method of determining a blur amount only in the object area, such as a face, may be appropriate.

In the above-described way, the moving image analyzing unit 203 determines a frame of which the calculated total score is equal to or greater than a predetermined value as a best shot from each of the moving and not-moving sections that have resulted from division.

The frame obtaining unit 204 cuts out the frame that has been determined to be the best shot from a moving image and stores the frame as image data in the storage device 104, based on the analysis result of the moving image analyzing unit 203. Here, the amount of motion, the camera work, and the score that are determined by the moving image analyzing unit 203 are stored in association with the cutout image data. The frame obtaining unit 204 may store a usage purpose in association with the image data, based on the score resulting from the determination, such as an image to be utilized for an album or a candidate image to be utilized by the user for replacement after an album is created.

The image obtaining unit 205 obtains an image group (image data group) designated by the album creation condition setting unit 201 from the storage device 104. Here, an image group refers to a candidate image group to be used for a layout of an album to be created. For example, in a case where the album creation condition setting unit 201 designates 01/01/XX to 31/12/XX as image-capturing dates, all images captured in 01/01/XX to 31/12/XX correspond to the designated image group. The image obtaining unit 205 also obtains the width and height information of each image in the designated image group.

Images stored in the storage device 104 include a still image and a cutout image that has been cut out from a moving image. A still image and a cutout image are obtained from an image-capturing device such as a digital camera or a smart device. The image-capturing device may be included in the image processing apparatus 100 or may be included in an external apparatus. Note that, in a case where the image-capturing device is an external apparatus, an image is obtained via the data communication device 108. Furthermore, a still image and a cutout image may be obtained from a storage or a server on a network, etc., via the data communication device 108. Examples of an image obtained from a server on a network include an image provided via a social networking service (hereinafter referred to as an "SNS image"). The program executed by the CPU 101 analyzes data attached to each image, so as to determine where the image is stored. The obtaining source of an SNS image may be managed in the application, so that an image can be obtained from an SNS via the application. Note that an image stored in the storage device 104 is not limited to the above-described images and may be another type of image.

The image conversion unit 206 converts the pixel count and color information of image data stored in the storage device 104. In the present embodiment, image data is converted into image data of which the pixel count on the short side is 420 pixels and the color information is sRGB.

The image analyzing unit 207 performs an analysis process on image data. In the present embodiment, the analysis process is performed on image data that has been converted by the image conversion unit 206. Specifically, a feature amount is obtained from image data, so as to execute object determination, face detection, facial expression recognition of a detected face, and personal recognition of a detected face for the image data. Furthermore, the image-capturing date and time is obtained from data (for example, Exif information) attached to an image obtained from the storage device 104. The analysis information including such obtained information as described above may be stored as a binary file for each image data. In a case of performing a layout process, the time period for analysis can be reduced by utilizing such a binary file of an analysis result.

The image classification unit 208 divides (performs image group division) the obtained image group, that is, the image group designated by the album creation condition setting unit 201, into sub-image groups (sub-image data group). The image group division is performed by use of information of the number of images, image-capturing date and time information included in analysis information obtained from the image analyzing unit 207, and information of a detected face. A scene refers to a predetermined scene for image-capturing, such as travel, daily life, or wedding. For example, a scene can be described as a group of images of an image-capturing target, which are captured at an image-capturing opportunity within a period of time.

The protagonist information input unit 209 inputs, to the image scoring unit 210, an individual ID (identification information) corresponding to the protagonist designated by the album creation condition setting unit 201, which is registered in a face dictionary database.

The image scoring unit 210 scores each image. In the present embodiment, each image is scored such that an image suitable for a layout has a high score. For giving a high score to an image suitable for a layout, analysis information of image data, a result of image classification, protagonist information, image information, and an album creation condition are used. Furthermore, another kind of information may be alternatively or additionally used. A calculated image scoring result may be stored as a binary file for each image. Note that, for image data that is cut out from a moving image as described later, a score is given by the image scoring unit 210 in consideration of an analysis result obtained by the moving image analyzing unit 203.

The number-of-double-page-spreads input unit 211 inputs, to the double-page spread allocating unit 212, the number of double-page spreads of an album designated by the album creation condition setting unit 201.

The double-page spread allocating unit 212 divides an image group for allocation to each double-page spread. A herein-described double-page spread refers to a double-page spread of two pages in a created album. Although an explanation is given of a double-page spread here, the present embodiment can be applied to a single page. The double-page spread allocating unit 212 divides an image group according to the input number of double-page spreads and allocates a part of the image group to each double-page spread. For example, in a case where the number of double-page spreads is 5, the obtained image group is divided into five sub-image groups, so as to allocate a sub-image group to each one of the double-page spreads.

The image selection unit 213 selects images from a sub-image group allocated to each of the double-page spreads by the double-page spread allocating unit 212, based on the score given by the image scoring unit 210, in descending order from the image with the highest score.

The template setting unit 214 retrieves multiple templates, according to template information designated by the album creation condition setting unit 201, from the storage device 104 and inputs the multiple templates to the image layout unit 215.

The image layout unit 215 determines the layout of images of a double-page spread or a page and outputs layout information. Specifically, from among the multiple templates that have been input by the template setting unit 214, the image layout unit 215 selects a template that is suitable for an image selected by the image selection unit 213. Then, the image layout unit 215 determines the position for arranging an image in the template selected for each page or double-page spread, so as to create layout information (also referred to as album data) of each page or double-page spread.

The layout information output unit 218 arranges layout information of pages or double-page spreads created by the image layout unit 215 in predetermined order, so as to output layout information of the entire album. For example, the layout information is bitmap data in which a selected image is arranged in a selected template. Furthermore, the layout information may be information indicating which image is arranged at which coordinates of which template.

The image correction unit 217 performs dodging correction, red-eye correction, and contrast correction. The image correction condition input unit 216 inputs, to the image correction unit 217, an "ON" or "OFF" condition regarding image correction designated by the album creation condition setting unit 201. "ON" or "OFF" of image correction can be designated for each type of correction or may be integrally designated for all types. In a case where an image correction condition is "ON", the image correction unit 217 performs the corresponding correction to an image. In a case where an image correction condition is "OFF", the corresponding correction is not performed. The pixel count of an image to be input by the image conversion unit 206 to the image correction unit 217 can be changed according to the size of a layout image that has been determined by the image layout unit 215. In the present embodiment, image correction is performed to each image after a layout image is created. However, the present embodiment is not limited as such, and it is possible to perform correction to each image before performing a layout (arrangement) for a double-page spread or a page.

The album display unit 220 performs display control by use of created album data, based on the layout information that has been output by the layout information output unit 218. As a result, images of the album data are displayed on the display 105.

The album creation application according to the present embodiment is installed to the image processing apparatus 100, and, in a case where the album creation application is launched by user operation, the program of the album creation application stored in the storage device 104 is loaded to the RAM 103. The program in the RAM 103 is executed by the CPU 101, so that the album creation application is launched.

Figure 3:
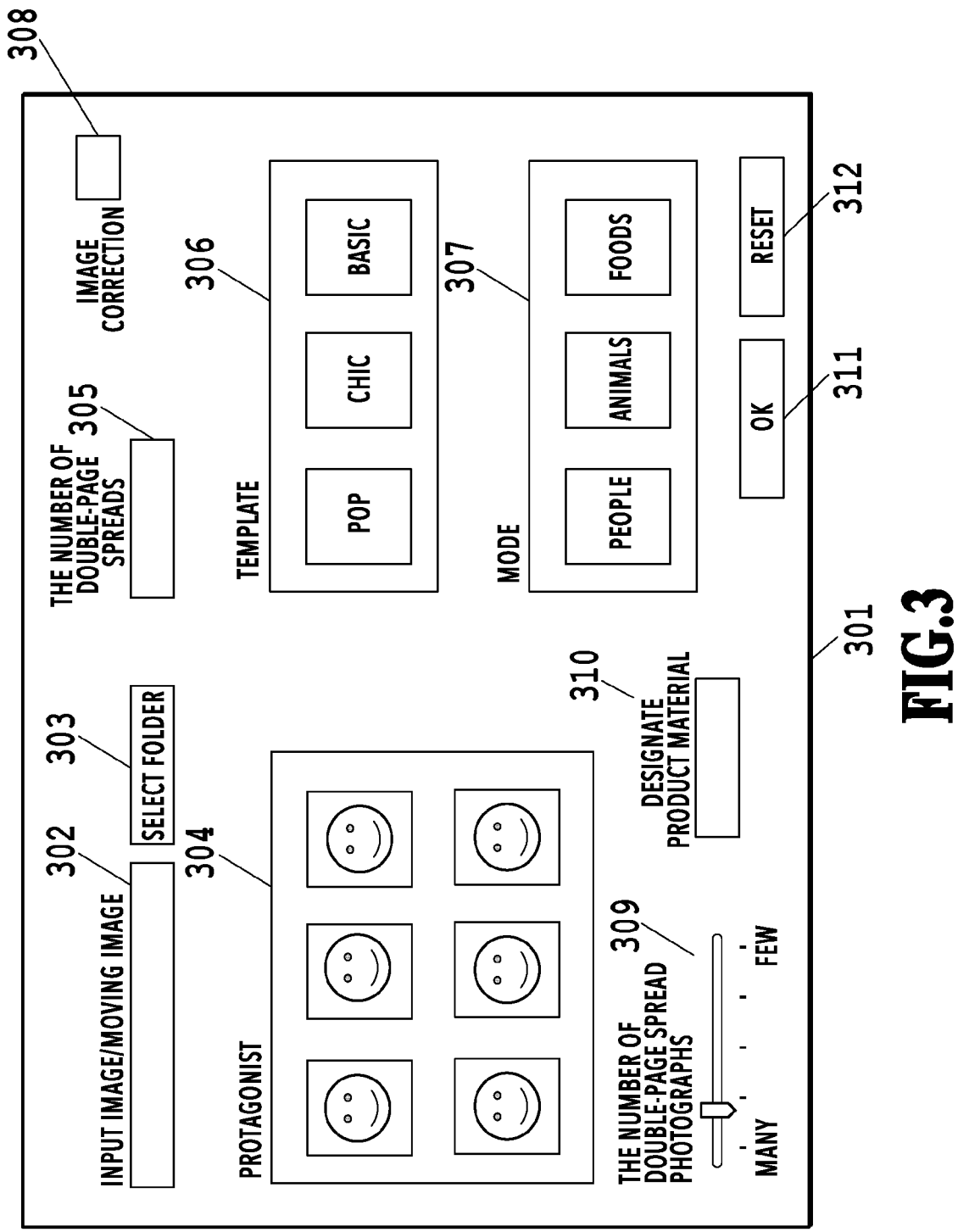
FIG. 3 is a diagram of a display screen to be displayed by the application according to the present invention.

FIG. 3 shows a display screen 301 provided by the launched album creation application. The display screen 301 is displayed on the display 105. The user can set an album creation condition via the display screen 301. The user can set such an album creation condition as described later via a UI screen on the display screen 301.

The display screen 301 includes a path box 302 and a folder selecting button 303 as a designation section for a group of images and moving images to be input. In the path box 302, the user inputs a storage location (path) of a folder that includes a group of images and moving images to be layout candidates for an album to be created. Further, the user can select the folder from a tree structure that is displayed upon clicking the folder selecting button 303 using the mouse 107. The selected folder path may be displayed in the path box 302 in a case where the user selects a folder including a group of images and moving images through the folder selecting button 303.

In the protagonist designation section 304, multiple face images of persons are displayed as icons, so that the user can designate the protagonist by selecting an icon. Note that, in the protagonist designation section 304, a face image is displayed for each person. In other words, in the protagonist designation section 304, one face image is displayed for one person, and each face image is associated with an individual ID.

Note that the protagonist designation section 304 is used to specify the protagonist, who is the main person, from an analysis target image, that is, from the person(s) appearing in a photograph. A face image is detected in advance from an image and registered in a face dictionary database in association with an individual ID, for example. Each icon displayed in the protagonist designation section 304 is a face image of a person selected by the user or a face image of a person determined in the later-described method from among the face images of the persons registered in the face dictionary database, for example. In the protagonist designation section 304, multiple icons of face images of different persons are arranged, each of which can be selected by clicking with the mouse 107. The protagonist can be automatically set by the procedure of FIG. 4 but can also be manually set by the user in the protagonist designation section 304. The person corresponding to the icon selected by the user from among the icons displayed in the protagonist designation section 304 is designated as the protagonist.

The number of double-page spreads box 305 is a box for designating the number of double-page spreads in an album. The user can directly input a number in the number of double-page spreads box 305 using the keyboard 106 or input a number in the number of double-page spreads box 305 from a list using the mouse 107.

In the template designation section 306, multiple illustration images, each of which indicates a theme (pop, chic, or the like) of the template, are displayed as icons, so that a template can be designated. In the present embodiment, each template has an image arrangement frame (slot) for arranging an image. In the template designation section 306, multiple template icons are arranged, and a template can be selected by clicking with the mouse 107.

In the mode designation section 307, multiple illustration images, each of which indicates an object to be considered for creating an album, are displayed as icons, so that an object can be designated. In the present embodiment, an explanation is given with three examples of objects, that is, "PEOPLE", "ANIMALS", and "FOODS". An object may be selected from among three or more objects including an object other than the above-described examples. Furthermore, although it is possible to designate multiple objects at the same time, for simplification of the explanation, the case in which one object is selected is explained here. By clicking an icon provided for each object in the mode designation section 307 using the mouse 107, an object to be considered can be designated.

By use of the check box 308, on and off of image correction can be designated. In a case where a check is made with the mouse 107, the above-mentioned image correction is turned on, and, in a case where a check is not made, the image correction is off. In the present embodiment, all types of image correction are turned on or off by use of one button. However, the present embodiment is not limited as such, and a check box may be provided for each type of image correction.

The number-of-double-page-spread-photographs designation bar 309 is a slider bar, with which the number of images to be arranged in each double-page spread of an album to be created can be set. In a case where the user sets the slider bar closer to "MANY", the number of images to be arranged in each double-page spread is increased. Furthermore, in a case where the user sets the slider bar closer to "FEW", the number of images to be arranged in each double-page spread is decreased.

The product material designation section 310 is for setting the product material for the album to be created. As for the product material, the size of the album and the paper type of the album can be set. The type of the cover or the type of the binding portion may be individually set.

The OK button 311 is a button for determining the conditions selected on the display screen 301 as the album creation conditions. In a case where the user selects the OK button 311 by clicking with the mouse 107, the album creation conditions are confirmed, and the album creation conditions are transmitted to the automatic layout processing unit 219 via the album creation condition setting unit 201. Specifically, the path that is input in the path box 302 is transmitted to the image obtaining unit 205. The individual ID corresponding to the icon that is section from among the multiple icons included in the protagonist designation section 304 is transmitted to the protagonist information input unit 209. The number of double-page spreads that is input in the number of double-page spreads box 305 is transmitted to the number-of-double-page-spreads input unit 211. The template information of the icon selected from among the multiple icons included in the template designation section 306 is transmitted to the template setting unit 214. On and off of the image correction in the check box for image correction is transmitted to the image correction condition input unit 216.

The reset button 312 is a button for resetting each of the setting information on the display screen.

Figure 4B:
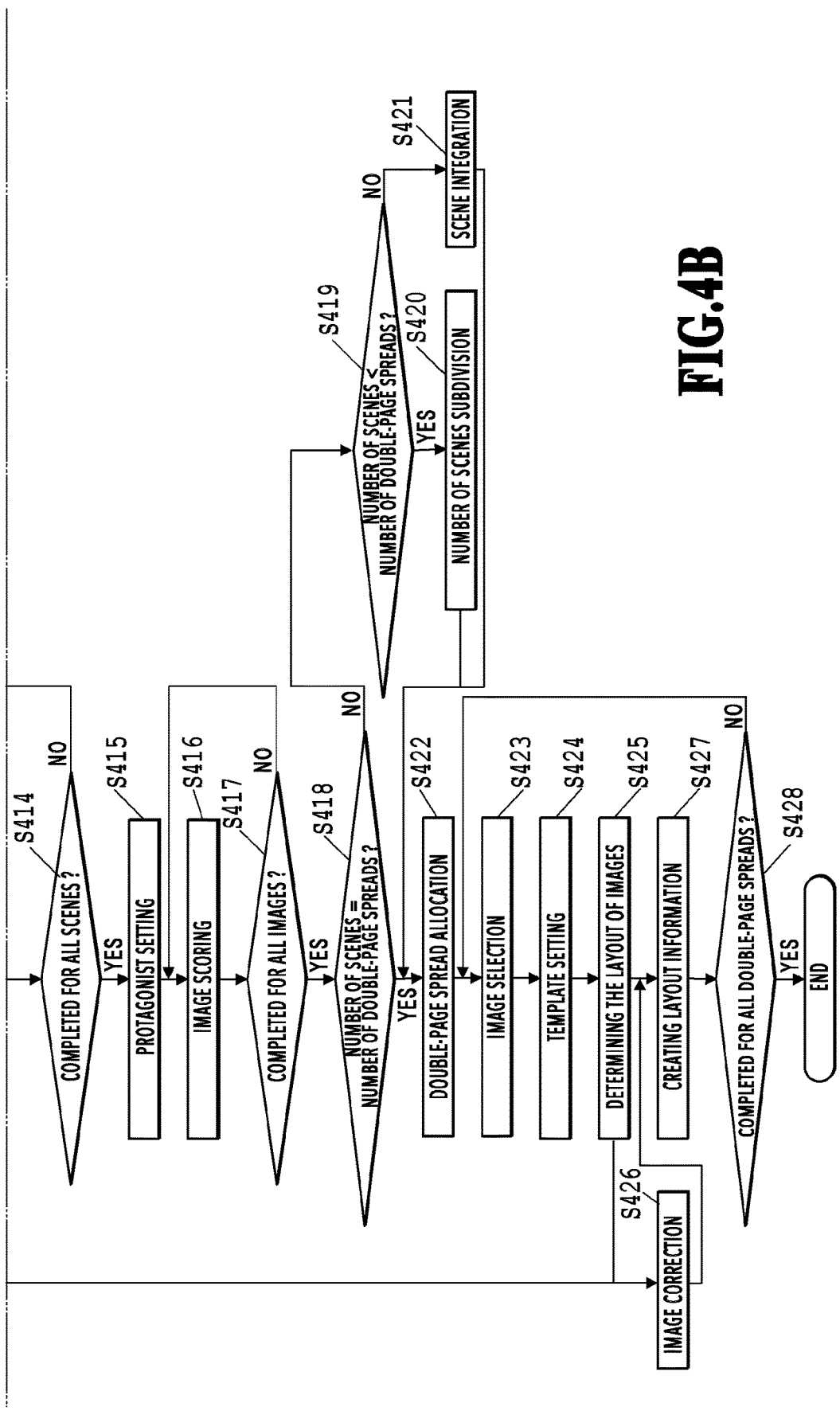
FIG. 4B is a diagram of a processing flow of an automatic layout according to the present invention.

FIG. 4 is a diagram of a processing flow for executing an automatic layout of the album creation application according to the present embodiment. For example, the flowchart illustrated in FIG. 4 is implemented by the CPU 101 retrieving a program stored in the storage device 104 into the ROM 102 or the RAM 103 and executing the program. The processing flow of the automatic layout is explained below with reference to FIG. 4. As described below, in the present embodiment, for creating an album, an image group to be used for creating an album is divided into sub-image groups according to the image-capturing times, and an image to be arranged in a page or a double-page spread is selected from each sub-image group (hereinafter may be referred to as a "section"), which results from the division.

In S401, the album creation condition setting unit 201 sets album creation conditions. Here, the information that has been set as for the group of images and moving images for creating an album, the protagonist, the number of double-page spreads, the template, the mode, and the image correction is set.

In S402, the moving image obtaining unit 202 obtains moving image data from the designated folder.

In S403, the moving image analyzing unit 203 analyzes the obtained moving image data. The moving image analyzing unit 203 calculates a total score value, which is obtained by combining the results regarding the amount of motion, the camera work, the blur and out-of-focus, the facial expressions, and the like. Furthermore, based on the calculated total score value, the moving image analyzing unit 203 may classify the data into data as an automatic layout candidate and data as an editing candidate, which is used for replacement during an editing work by the user. For example, the data may be classified into data as an automatic layout candidate in a case where the calculated total score value is equal to or greater than a predetermined threshold value.

In S404, the frame obtaining unit 204 cuts out a frame having a total score value that is equal to or greater than a predetermined threshold value from the analyzed moving image data, so that the frame is stored in the storage device 104 as image data. The analysis results (the amount of motion, the camera work, the total score value, etc.) corresponding to the stored frame may be stored in the storage device 104 in association with the frame.

In S405, the moving image analyzing unit 203 determines whether or not S402 to S404 have been completed for all the moving images of the designated moving image group in the storage device 104, which has been designated by the album creation condition setting unit 201. In a case where the processing has not been completed ("NO" in S405), the processing returns to S402. In a case where the processing has been completed ("YES" in S405), the processing proceeds to S406.

In S406, the image obtaining unit 205 retrieves an image included in the designated image group from the storage device 104 into the RAM 103.

In S407, the image conversion unit 206 generates analysis image data from the image data retrieved into the RAM 103. The image conversion unit 206 obtains the image group corresponding to the conditions designated by the album creation condition setting unit 201 from the storage device 104, so as to convert each image of the obtained image group into data with a desired pixel count and color information. Note that, here, the pixel count and color information resulting from the conversion are predetermined and stored in a program or a parameter file used by a program. In the present embodiment, the input image data is converted into analysis image data having a size of 420 pixels on the short side and an sRGB color space.

In S408, the image analyzing unit 207 obtains information attached to the image data and a feature amount of the image quality of the analysis image data. The image analyzing unit 207 obtains the image-capturing date and time from the information attached to each image data included in the image group obtained from the storage device 104. In the present embodiment, the image-capturing date and time is obtained from Exif information attached to each image data. In addition, the image analyzing unit 207 obtains a feature amount of the image quality from the analysis image data generated in S407. An example of the feature amount of the image quality is focus. As a method for detecting an edge, the publicly known Sobel filter can be used. An edge of an image is detected by the Sobel filter, and the gradient of the edge, that is, the luminance gradient is calculated by dividing the luminance difference between the start point and the end point of the edge by the distance between the start point and the end point. The average gradient of the edges in the image is calculated, and an image whose average gradient is large is determined to be in better focus, compared to an image whose average gradient is small. In the present embodiment, multiple threshold values are set for the gradient, so that whether the in-focus degree is acceptable or not is determined by determining that the average gradient is equal to or greater than whichever of the threshold values for the gradient. In the present embodiment, two different threshold values are set for the gradient, so that the in-focus degree is determined in three levels, that is, "A", "B", and "C". In a case where the average gradient of the edges in the image is equal to or greater than the first threshold value, the focus gradient is determined as "A" (preferred). In a case where the average gradient of the edges in the image is equal to or greater than the second threshold value, which is lower than the first threshold value, the focus gradient is determined as "B" (acceptable). In a case where the average gradient of the edges in the image is smaller than the second threshold value, the focus gradient is determined as "C" (unacceptable).

In S409, the image analyzing unit 207 detects and recognizes an object in each analysis image data. A face is detected from the analysis image data generated in S407. A publicly known method can be used for face detection. Examples of the known method include AdaBoost, which creates a strong discriminator from multiple weak discriminators that have been prepared. In the present embodiment, the image analyzing unit 207 detects the face of a person (object) by use of a strong discriminator created by AdaBoost. In S409, the image analyzing unit 207 detects (extracts) the face image as well as obtains the upper left coordinate values and the lower right coordinate values of the position of the detected face image in the image. Note that the "image" described herein is the image represented by the analysis image data generated in S407. By specifying the two kinds of coordinates, it is possible to specify the position and size of the face of the person. Furthermore, in the same manner as the face detection, the image analyzing unit 207 also executes AdaBoost for detecting an animal, such as a dog or a cat, and a food, respectively. As a result, it is possible for the image analyzing unit 207 to detect an object, which may be a person, an animal, or a food, and to classify and recognize the object at the same time. Note that, not only the above-described examples, a flower, a building, a figurine, etc., may be recognized. Although the explanation has been given of the object classification by use of AdaBoost, it is also possible to use image recognition by use of a deep neural network. The image analyzing unit 207 creates a face dictionary database by assigning an individual ID to the face image that has been recognized in the above manner.

In S410, the image analyzing unit 207 executes personal recognition. First, the face image extracted in S409 is compared with the representative face image stored for each individual ID in the face dictionary database, so as to obtain the similarity. Then, the individual ID with the highest similarity, which is also equal to or greater than a threshold value, is determined as the individual ID corresponding to the extracted face image. That is, the image analyzing unit 207 specifies the person corresponding to the individual ID with the highest similarity, which is also equal to or greater than the threshold value, as the person corresponding to the extracted face image. Note that, in a case where the similarity is smaller than the threshold value, the extracted face image is regarded as a new person and assigned with a new individual ID, then registered in the face dictionary database.

As illustrated in FIG. 5, the image analysis information of each analysis image data obtained from S408 to S410 is separately stored in the storage device 104 for each ID for identifying the image. The image analyzing unit 207 stores the image-capturing date and time information and the focus determination result obtained in S408 as well as the number of faces and the position information detected in S409 as image analysis information of the analysis image data. Note that, although an image based on one analysis image data may include multiple face images, the position information of the faces are separately stored for respective individual IDs that are obtained in S410. Note that, in a case where no face is detected in image data, the image-capturing date and time information and the focus determination result that are obtained in S408 are stored. Furthermore, the image analyzing unit 207 stores the main objects included in an image in order from the one with the highest reliability at a timing of executing the AdaBoost. Here, in a case where no object is detected, information about an object is not stored. Objects other than a face are stored in the same manner. AdaBoost connects weak discriminators for discriminating a pattern in succession, so as to form one strong discriminator. Therefore, the reliability increases with increase of the number of weak discriminators that match the pattern learned in advance in AdaBoost. Although, here, the explanation has been given of the object determination with the example of AdaBoost, the object determination may be performed with discriminators by use of a convolutional neural network such as a deep neural network.

In S411, the image analyzing unit 207 determines whether or not S407 to S410 have been completed for all the images of the designated image group in the storage device 104, which has been designated by the album creation condition setting unit 201. In a case where the processing has not been completed ("NO" in S411), the processing returns to S406. In a case where the processing has been completed ("YES" in S411), the processing proceeds to S412.

In S412, the image classification unit 208 performs image group division on a group of analysis images. Image group division is to divide an obtained group of analysis images into multiple sub-image groups, each of which is a group of images having close image-capturing dates and times. Specifically, a group of analysis images is divided into multiple sub-image groups according to time differences between analysis images based on the image-capturing date and time information, which has been obtained in S408. Examples of references for the division are as described below. For example, of the group of analysis images, the image data having the earliest (or the latest) image-capturing date and time is firstly targeted as an image of interest, so that the time difference from the second earliest (or the second latest) image data is referred. While sequentially replacing an image of interest with one having later (or earlier) image-capturing date and time, which of the conditions described below the time difference falls into is determined. Note that dividing in the following explanation means to obtain a sub-image group of later image-capturing dates and times and a sub-image group of earlier image-capturing dates and times as a result of division at the boundary between two image data.

Figure 6A:
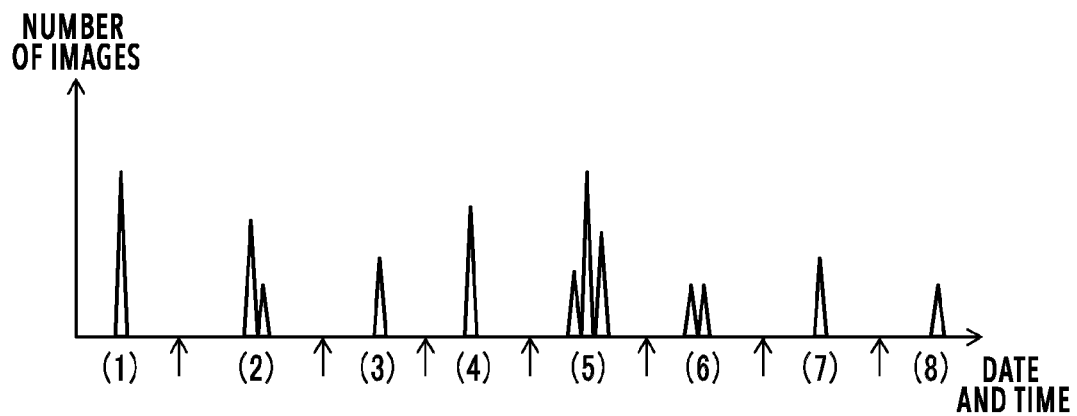
FIG. 6A is a diagram for explaining image group division according to the present invention.

First, in a case where the image-capturing dates are not continuous, that is, in a case where there is a date on which no image is captured between images, those images are divided. Next, an explanation is given of the case in which image-capturing dates are continuous. In the present embodiment, in a case where the difference between the image-capturing times of images is equal to or longer than 16 hours, those images are divided. In a case where the difference between the image-capturing times of images is shorter than 16 hours, images are divided into each image-capturing date if the time difference between the firstly-captured image and the lastly-captured image on the date of the continuous dates is shorter than four hours. In the present embodiment, in a case where the time difference is equal to or longer than four hours, images are divided into each image-capturing date if the number of captured images on the date of the continuous dates is less than 50, and images are not divided if the number of captured images on the date of the continuous dates is equal to or greater than 50. Note that the threshold value for the time difference and the threshold value for the number of images for division are not limited to as described above. FIG. 6A shows a result of division by the above-described method of image group division, in which images are divided into eight sub-image groups.

In S413, the image classification unit 208 performs scene classification. Although an explanation is given of the case in which each sub-image group is classified into any of the three scenes, that is, travel, daily life, and a ceremony in the present embodiment, the scenes to be classified into are not limited to the three scenes.

First, the image classification unit 208 obtains multiple sub-image groups. The scene that each of the sub-image groups is classified into, which may be travel, daily life, or ceremony, has been determined in advance. Then, for the sub-image groups of each scene, the image classification unit 208 obtains feature amounts of the captured images. Examples of a feature amount obtained in the present embodiment include an image-capturing period, the number of captured images, and the number of people in a captured image, for example. An image-capturing period is the time difference between the firstly-captured image and the lastly-captured image in a sub-image group. The number of captured images is the number of images (the number of photographs) included in a sub-image group. The number of people in a captured image is the number of faces in an image in which a face is captured. That is, the number of people in a captured image is the number of faces included in one image. Then, for the sub-image groups of each scene, the average value and the standard deviation of the image-capturing periods, the average value and the standard deviation of the numbers of captured images, and the average value and the standard deviation of the numbers of people in each image are obtained. Note that, in the present embodiment, it is assumed that the number of faces in one image is the number of people in one image. FIG. 7 shows an example of respective average values and standard deviations of the image-capturing periods (hours), the numbers of captured images (images), and the numbers of people in a captured image (people). The obtained values are incorporated into the program of the album creation application in advance. That is, a parameter for characterizing a scene is created by learning at a designing stage by use of a group of sample images (teacher images) collected in advance, and the parameter is incorporated into the program in advance or stored in a referable state for the program.

After the album creation application is launched, the image group designated by the user by use of the path box 302 is obtained by the image obtaining unit 205 in S406, and the obtained image group is converted by the image conversion unit 206 into analysis images in S407. The group of analysis images is divided into sub-image groups by the image classification unit 208 in S412. Then, the image classification unit 208 calculates feature amounts, which are the image-capturing period, the number of captured images, and the average value of the numbers of people in a captured image of each sub-image group. Then, the image classification unit 208 calculates the scores for the respective scenes for each sub-image group by the following formulas, based on the calculated feature amounts of the sub-image group and the average values and standard deviations corresponding to respective scenes and feature amounts, which are calculated in advance.

Score for each scene and feature amount=50−|10× (average value for each scene and feature amount−feature amount of sub-image group)/ standard deviation for each scene and feature amount|      Formula (1)

Average score for each scene=(score of image-capturing period for each scene+score of number of captured images for each scene+score of number of people in captured image for each scene)/number of feature amount items     Formula (2)

Note that the number of feature amount items in Formula (2) is 3 in this case. By the Formulas (1) and (2), the scores of a target sub-image group for the respective scenes are calculated. For example, based on the average values and standard deviations shown in FIG. 7 and Formula (1), the scores of the image-capturing period, the number of captured images, and the number of people in a captured image for a travel scene are calculated, respectively. That is, the score of the image-capturing period for a travel scene is: 50−|10×(33.221−image-capturing period of sub-image group)/4.778|. The score of the number of captured images for a travel scene is: 50−|10×(324.857−number of captured images of sub-image group)/393.691|. The score of the number of people in a captured image for a travel scene is: 50−|10×(1.506−number of people in a captured image of sub-image group)/0.256|. The scores of the respective feature amounts for a travel scene calculated by Formula (1) are averaged by Formula (2), so as to obtain the score related to a travel scene. Similarly, scores for the other scenes, that is, daily life and ceremony, are obtained as well.

In the above way, the average scores for the respective scenes, that is, the travel, daily life, and ceremony scenes, are calculated for each of the sub-image groups resulting from the division in S412. Thereby, the image classification unit 208 classifies a sub-image group into the scene with the highest score among the average scores calculated for the respective scenes for each sub-image group. In a case where two or more scenes have the same score, the scene classification is performed according to a predetermined priority order of the scenes. For example, in the present embodiment, priority is set in advance in the order of daily life, ceremony, and travel. That is, daily life has the highest priority. Note that the order of the priority is not limited as such, and the order of the priority may be set by the user.

As for the sub-image group (5) resulting from the scene division as illustrated in FIG. 6A, the image-capturing period is 36 hours, the number of captured images is 300, and the number of people in a captured image is 1.7. Since the average score for travel is 45.32, the average score for daily life is 18.38, and the average score for ceremony is −29.92, the scene of the sub-image group (5) is classified into travel. The sub-image group is managed in association with a scene ID so that the scene can be identified.

In S414, the image classification unit 208 determines whether or not the scene classification in S413 has been completed for all the sub-image groups, which have resulted from the division in S412. In a case where the scene classification has not been completed ("NO" in S414), the processing returns to S413. In a case where the scene classification has been completed ("YES" in S414), the processing proceeds to S415.

In S415, the image scoring unit 210 performs a protagonist setting. The protagonist setting is performed for the image group designated by the user. Further, there are two types of protagonist settings, that is, an automatic setting and a manual setting. In a case where the protagonist is automatically set, the image scoring unit 210 sets the protagonist, based on the result of the personal recognition in S410 and the result of the image group division in S412. Based on the result obtained in S410, the number of times each individual ID appears in the sub-image group, the number of times each individual ID appears in each scene, the number of times each scene with each individual ID appears, and the like, are specified, so that the protagonist is automatically set based on the information. In the present embodiment, in a case where the sub-image groups are classified into multiple scenes, the individual ID that appears in multiple scenes is set as the protagonist ID, and, in a case where all the sub-image groups are classified into a single scene, the individual ID that most frequently appears in all the sub-image groups is set as the protagonist ID. In a case where a specific icon has been designated by the user in the protagonist designation section 304, the individual ID corresponding to the selected icon is transmitted to the image scoring unit 210 via the protagonist information input unit 209. In a case where there is an individual ID designated by the user, the protagonist ID to be automatically set as described above is ignored, and the individual ID designated by the user is set as the protagonist ID. As described above, the setting based on the designation by the user in the protagonist designation section 304 is the manual setting.

In S416, the image scoring unit 210 performs scoring. Scoring is to give a score, which is a value to be referred to at the time of the later-described image selection, based on evaluation per image data from the later-described viewpoints. Furthermore, for image data that is cut out from a moving image, the scoring is performed in consideration of a result of analysis by the moving image analyzing unit 203. Here, the method for scoring is explained with reference to FIGS. 8A, 8B, 10A, and 10B.

Figure 10A:
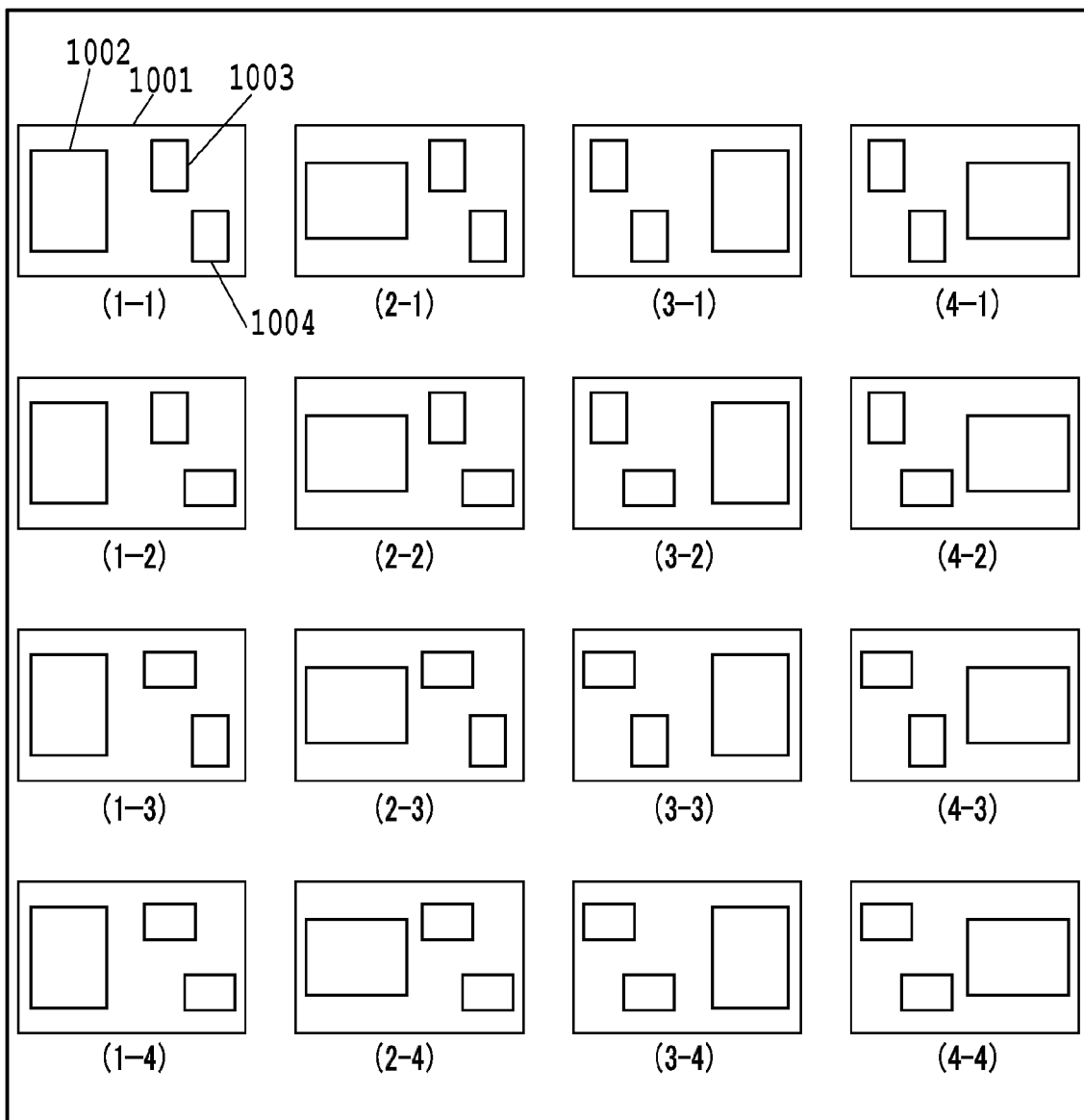
FIG. 10A is a diagram for explaining a layout of images according to the present invention.

FIG. 10A shows a template group for arranging three images. The template 1001 shown as (1-1) of FIG. 10A is one of the templates and includes the main-slot 1002, the sub-slot 1003, and the sub-slot 1004. The main-slot 1002 is the main slot (position where an image is arranged) of the template 1001 and is larger in size than the sub-slots 1003 and 1004. That is, a main-slot is the slot having the largest size in each template. Furthermore, a sub-slot is a slot other than the main-slot in each template. In the present embodiment, both the score for a main-slot and the score for a sub-slot are set for each image data.

Next, FIG. 8A shows references for scoring of image data. More specifically, FIG. 8A is a table summarizing the characteristics of an image to which a high score is given for each of the scenes of travel, daily life, and ceremony. Note that, as shown in FIG. 8A, the characteristic to obtain a high score differs according to the type of slot. For example, in a case where the scene classification of a sub-image group is travel, a long shot image including a person and a landscape is to obtain a high score for a main-slot, and an image of a close-up face or a side face is to obtain a high score for a sub-slot. On the other hand, in a case where the scene classification of a sub-image group is daily life, an image of a close-up face or a side face is to obtain a high score for a main-slot, and a long shot image including a person and a landscape is to obtain a high score for a sub-slot. Furthermore, in a case where the scene classification of a sub-image group is ceremony, an image of two people being close from each other is to obtain a high score for a main-slot, and an image of a large number of people is to obtain a high score for a sub-slot. As described above, the characteristic to obtain a high score, in other words, the reference for evaluation differs in accordance with the scene and the type of slot. In the present embodiment, it is assumed that the references for evaluation or the characteristics to obtain a high score in accordance with the scenes and the types of slots are set in the application in advance and included in the program.

Note that the characteristics to obtain a high score are not limited to the ones described above. Each image data included in each sub-image group is scored based on the references for evaluation for a main-slot and a sub-slot of each scene shown in FIG. 8A.

From a group of sample images collected in advance, feature amounts such as the number of faces in each image, the position of a face in each image, and the size of a face in each image, are obtained, respectively. Then, the average value and the standard deviation of each of the feature amounts are calculated for each scene and slot type (main-slot and sub-slot) and incorporated into the program of the album creation application in advance.

In a case where the scene classification for the image group designated by the user is completed, each of the feature amounts, such as the number of faces corresponding to the protagonist ID, the position of a face, and the size of a face, is calculated for each image of the image group. Further, a scene to which each image belongs (is classified) is obtained, based on the result of the scene classification in S413. Then, regarding a target image, the score for each scene and slot type is obtained by the following formula, based on the feature amounts related to the protagonist ID in the target image, such as the number of faces, the face position, and the face size, and the average values and the standard deviations of the respective feature amounts for each scene and slot type, which are calculated in advance. In the following formulas, a score, an average value, and a standard deviation are calculated for each scene classification, slot type, and feature amount.

Score of each feature amount for each scene and slot type=50−|10×(average value of each feature amount for each scene and slot type−each feature amount of target image)/standard deviation of each feature amount for each scene and slot type|     Formula (3)

Average score for each scene and slot type=(score of number of faces for each scene and slot type+score of face position for each scene and slot type+score of face size for each scene and slot type)/number of feature amount items     Formula (4)

Note that the number of feature amount items in Formula (4) is 3 in this case. As described above, as the scores corresponding to each image, a score for a main-slot and a score for a sub-slot are given.

Furthermore, to the calculated scores described above, a score is added based on the mode designated by the album creation condition setting unit 201. In a case where "PEOPLE" is set as the mode, a score is added to an image whose object classification stored as the image analysis information of FIG. 5 includes "PEOPLE" in any of TOP1 through TOP3. The higher the reliability of the object classification result is, the greater the score to be added becomes. Alternatively, the score to be added may be changed according to the rank of the object classification result. Here, for the sake of explanation, the explanation has been given of the case in which "PEOPLE" is selected as the mode. However, in a case where "ANIMALS", "FOODS", or the like, is set as the mode, a score is added under equivalent conditions. Additionally, the number of modes to be selected may be two or more, not only one. In such a case, scores may be added according to the selected objects that are included.

Furthermore, an additional score may be added to the score of an image corresponding to an image ID whose feature amount of focus included in the image analysis information of FIG. 5 is "A". In this way, it is possible to increase the score of an image in focus.

FIG. 8B shows an example of scoring results of each image, in which scores for a main-slot and a sub-slot are given to each image ID. After both scores for a main-slot and a sub-slot are set for each image, in a case where the type of image is a moving image according to the image analysis information of FIG. 5, the score value obtained by analysis and calculation by the moving image analyzing unit 203 is added to both of the scores for a main-slot and a sub-slot. Although the method of utilizing the score value calculated by the moving image analyzing unit 203 is described here, the score value to be added may be increased in accordance with the magnitude of the amount of motion. Alternatively, a predetermined score value may be added to a frame after zooming in or a frame after panning or tilting by camera work. In this way, it is possible to reflect the user's intention at the time of capturing the moving image.

In a case where a score value is added only at the time of capturing moving images, there is a possibility that higher scores are given to images cut out from a moving image, compared to still images. In that case, the average value of the score values of the cutout images calculated by the moving image analyzing unit 203 may be calculated and added to the score values of all the still images or subtracted from the score values of the cutout images.

In S417, the image scoring unit 210 determines whether the image scoring in S416 has been completed for all the images in the image group designated by the user or not. In a case where the image scoring has not been completed ("NO" in S417), the processing returns to S416. In a case where the image scoring has been completed ("YES" in S417), the processing proceeds to S418.

In S418, the double-page spread allocating unit 212 determines whether or not the number of sub-image groups obtained as a result of the image group division by the image classification unit 208 is the same as the number of double-page spreads, which is input by the number-of-double-page-spreads input unit 211. In a case where the numbers are not the same ("NO" in S418), the processing proceeds to S419. In a case where the numbers are the same ("YES" in S418), the processing proceeds to S422. For example, in a case where the number of sub-image groups in FIG. 6A is 8 and the number that has been input by the number-of-double-page-spreads input unit 211 is 8, S418 results in "YES", and the processing proceeds to S422.

In S419, the double-page spread allocating unit 212 determines whether or not the number of sub-image groups obtained as a result of the image group division by the image classification unit 208 is smaller than the number of double-page spreads, which is input by the number-of-double-page-spreads input unit 211. In a case where the number of sub-image groups is equal to or greater than the number of double-page spreads ("NO" in S419), the processing proceeds to S421. In a case where the number of sub-image groups is smaller than the number of double-page spreads ("YES" in S419), the processing proceeds to S420. For example, in a case where the number of sub-image groups in FIG. 6A resulting from the division is 8 and the number that has been input by the number-of-double-page-spreads input unit 211 is 8, S419 results in "NO" because the number of sub-image groups is equal to or greater than the number of double-page spreads, and the processing proceeds to S421.

In S420, the double-page spread allocating unit 212 performs sub-image group subdivision. Sub-image group subdivision refers to further subdividing a sub-image group, which results from division, in a case where the number of sub-image groups is less than the number of double-page spreads.

Figure 6B:
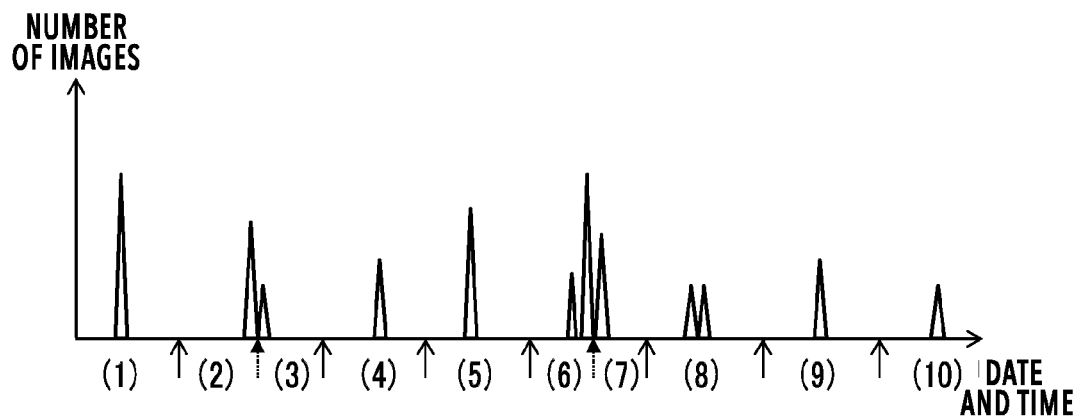
FIG. 6B is a diagram for explaining image group division according to the present invention.

The case in which the designated number of double-page spreads is 10 while the number of sub-image groups, which result from division, is 8 as in FIG. 6A is taken as an example for explanation. FIG. 6B shows a result of sub-image group subdivision performed on a part of the sub-image groups in FIG. 6A, so that the number of sub-image groups becomes 10. By dividing the sub-image groups at the points indicated by the dashed-line arrows of FIG. 6B, the number of sub-image groups is changed to 10. Note that, in FIG. 6B, there are the dashed-line arrows between the sub-image groups (2) and (3) and between the sub-image groups (6) and (7). The references for determining a sub-image group to be divided are the number of images and the image-capturing dates and times of the sub-image group. First, a sub-image group having a large number of images is specified from among the sub-image groups of FIG. 6A. Here, to increase the number of sub-image groups by two, from 8 to 10, two sub-image groups having a large number of images are specified. That is, according to the number of sub-image groups to be subdivided, the sub-image groups are designated in descending order from the sub-image group including the largest number of images. For sub-image groups including the same number of images, the sub-image group of which the maximum value of the differences between the image-capturing dates and times of the images is greater is to be selected. In a case where determination is still not possible, it may be appropriately predetermined that subdivision is preferentially performed to a sub-image group of an earlier time, for example.

In FIG. 6A, the sub-image groups having a large number of images are the sub-image group (5), then the sub-image group (1) and the sub-image group (2), in descending order. In the present embodiment, in a case where sub-image groups include the same number of images, the sub-image group of which the maximum value of the time differences between the images included in the sub-image group is greater is to be divided. The sub-image group (1) and the sub-image group (2) include the same number of images, but the maximum value of the time differences between the images included in the sub-image group (2) is greater. Therefore, the sub-image group (2) becomes the division target. That is, in FIG. 6A, each of the sub-image group (5) and the sub-image group (2) is further divided.

First, an explanation is given of the method for subdividing the sub-image group (2). The sub-image group (2) has two peaks corresponding to the numbers of images, and the groups of images corresponding to the two peaks have different image-capturing dates, respectively. In such a case, division is performed to the point (the point indicated by the dashed-line arrow between the sub-image group (2) and the sub-image group (3) of FIG. 6B) at which the image-capturing dates change.

Next, an explanation is given of subdivision performed to the sub-image group (5). The sub-image group (5) has three peaks corresponding to the numbers of images, and the groups of images corresponding to the three peaks have different image-capturing dates, respectively. Even in such a case, division is performed to a point at which the image-capturing dates change. Here, although there are two points at which the image-capturing dates change, division is performed such that there will be less difference between the numbers of images in image groups after division. Regarding the sub-image group (5) in FIG. 6B, there will be less difference between the numbers of images in image groups after subdivision in a case where division is performed at the boundary between the second day and the third day, compared to a case where division is performed at the boundary between the first day and the second day. Therefore, division is performed at the boundary between the second day and the third day. That is, division is performed to the point indicated by the dashed-line arrow between the sub-image group (6) and the sub-image group (7) of FIG. 6B.

In the above way, the number of sub-image groups is changed from 8 to 10. Here, the division is performed at the point between different image-capturing dates. However, in a case of a sub-image group having a number of images captured in a single day, division is performed at the point where the time difference is largest in the single day.

In S421, the double-page spread allocating unit 212 integrates sub-image groups. Sub-image group integration is to integrate sub-image groups, which have resulted from division, in a case where the number of sub-image groups is greater than the number of double-page spreads. Specifically, sub-image groups are integrated such that the number of sub-image groups matches the number of double-page spreads.

Figure 6C:
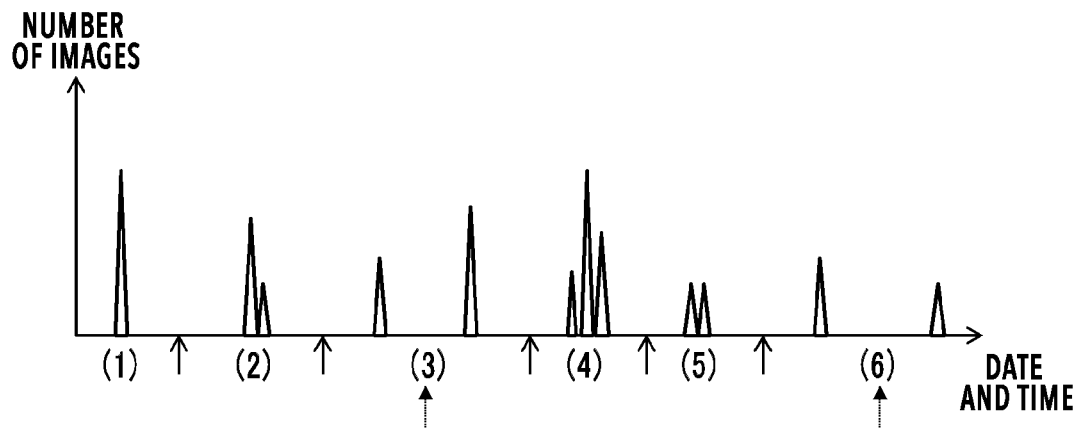
FIG. 6C is a diagram for explaining image group division according to the present invention.

The case in which the designated number of double-page spreads is 6 while the number of sub-image groups is 8 as in FIG. 6A is taken as an example for explanation. FIG. 6C shows a result of sub-image group integration performed on FIG. 6A, so that the number of sub-image groups becomes 6. The sub-image groups on both sides of the dashed lines in FIG. 6C are integrated, in other words, division is not performed at the points indicated by the dashed lines, so that the number of sub-image groups becomes 6. First, a sub-image group having a small number of images is specified from among the sub-image groups of FIG. 6A. Here, to reduce the number of divisions by two, from 8 to 6, two sub-image groups having a small number of images are specified. In FIG. 6A, the sub-image groups having a small number of images are the sub-image group (8), then the sub-image group (3) and the sub-image group (7), in ascending order. Therefore, first, the sub-image group (8) becomes the integration target. The sub-image group (3) and the sub-image group (7) include the same number of images. However, the sub-image group (8), which is adjacent to the sub-image group (7), is the integration target. Therefore, the sub-image group (3) becomes the integration target.

Next, whether the sub-image groups that are the integration targets are integrated with the sub-image groups of the earlier image-capturing dates and times or integrated with the sub-image groups of the later image-capturing dates and times is determined. First, an explanation is given of the integration of the sub-image group (3). First, the time difference between the sub-image group (3) and the previous sub-image group (2) is compared with the time difference between the sub-image group (3) and the following sub-image group (4). The difference between the image-capturing times of the last image of the sub-image group (3) and the first image of the sub-image group (4) is less than the difference between the image-capturing times of the first image of the sub-image group (3) and the last image of the sub-image group (2). Therefore, it is determined that the sub-image group (3) is integrated with the sub-image group (4). That is, the sub-image groups are integrated at the point indicated by the dashed line of (3) in FIG. 6C.

Next, an explanation is given of the integration of the sub-image group (8). Since the sub-image group (8) is followed by no sub-image group, the sub-image group (8) is integrated with the previous sub-image group (7). That is, integration is performed at the point indicated by the dashed line of (6) in FIG. 6C. Note that, although the sub-image groups of which the difference in the image-capturing times is small are integrated with each other in the present embodiment, the present embodiment is not limited as such. For example, a sub-image group that is an integration target may be integrated with a sub-image group having a small number of captured images.

In S422, the double-page spread allocating unit 212 performs double-page spread allocation. By S418 through S421, the number of sub-image groups has become the same as the designated number of double-page spreads. In the present embodiment, the sub-image group having the earliest image-capturing date and time is firstly allocated to the first double-page spread. That is, the sub-image groups are allocated to the double-page spreads of an album, respectively, in the order of the image-capturing dates and times. Accordingly, it is possible to create an album in which the sub-image groups are arranged in the order of the image-capturing dates and times. Note that, as described later, it is not necessary that the images in a single double-page spread are arranged based on the image-capturing dates and times.

Figure 9:
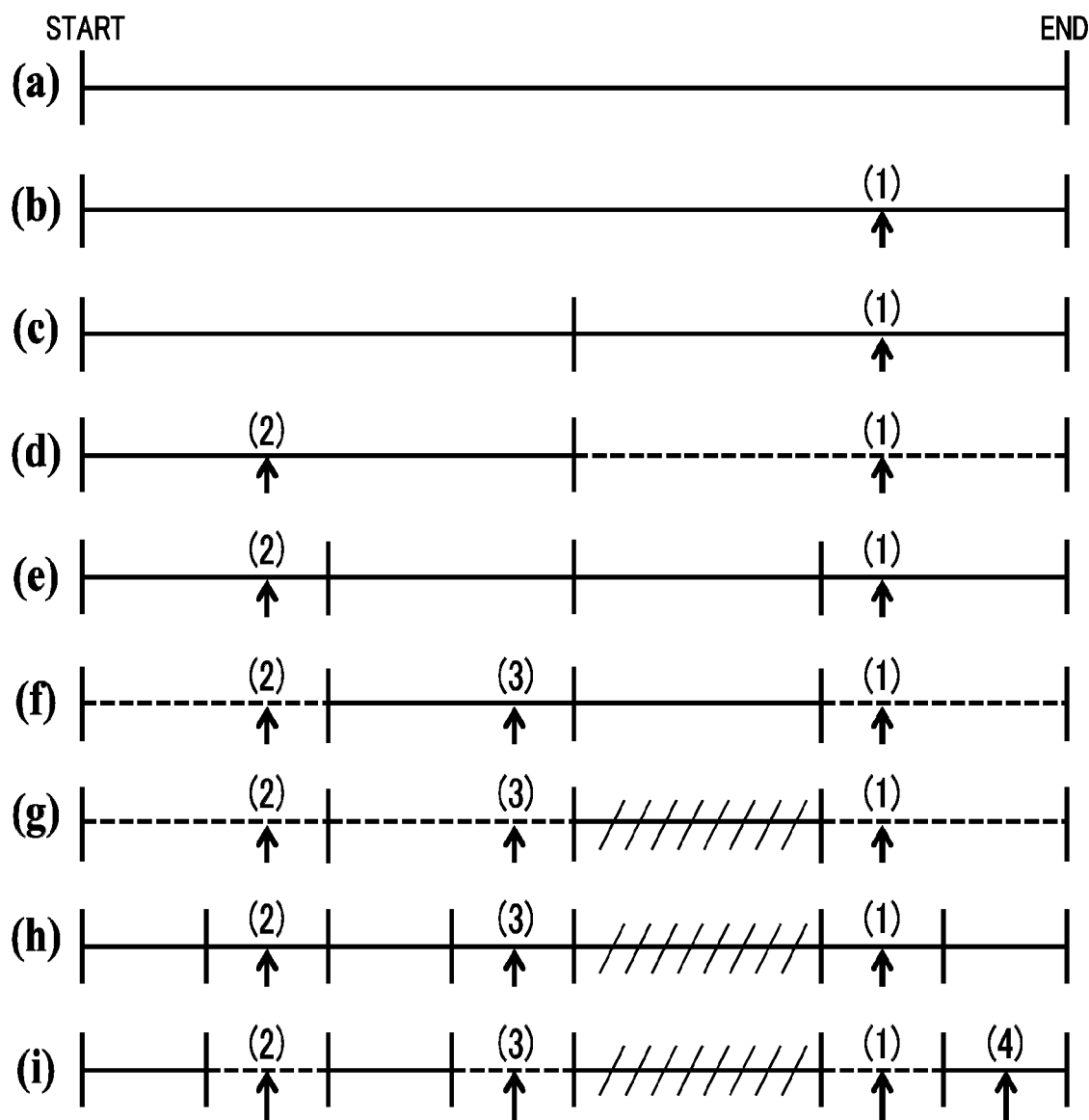
FIG. 9 is a diagram for explaining image selection according to the present invention.

In S423, the image selection unit 213 selects a predetermined number of images from each sub-image group. With reference to FIG. 9, the case in which four images are selected from a sub-image group allocated to a given double-page spread is taken as an example for explanation. Note that, here, the number of pages of a double-page spread is one or two. That is, the number of pages of the double-page spreads other than the first spread and the last spread is two pages that are next to each other in an opened state, and the number of pages of the first spread and the last spread is one page.

(a) of FIG. 9 shows the time difference from the image-capturing date and time of the first image to the image-capturing date and time of the last image included in the sub-image group allocated to a double-page spread. In other words, (a) of FIG. 9 shows the image-capturing period of the sub-image group. With reference to (b) of FIG. 9, an explanation is given of a method for selecting the first image of four images to be selected. The template 1001 shown in FIG. 10A includes one main-slot 1002. The first image to be selected is an image for a main-slot. Among all the images that are captured in the image-capturing period of the sub-image group shown in (b) of FIG. 9, the image selection unit 213 selects the image having the highest score for a main-slot, which has been given in S416.

Then, the second and subsequent images to be selected are images for a sub-slot. In the present embodiment, the image-capturing period of the sub-image group is subdivided for selecting an image, so that the selected images are not concentrated in a part of the image-capturing period of the sub-image group. First, the image selection unit 213 divides the image-capturing period of the sub-image group into two, so that there are two image-capturing time sections, as shown in (c) of FIG. 9. In other words, the image-capturing period of the sub-image group is divided in half, so that there are two image-capturing time sections (grouping is performed). Next, as shown in (d) of FIG. 9, the image selection unit 213 selects the image having the highest score for a sub-slot, as the second image, from the image-capturing time section from which the first image is not selected (the section indicated by the solid line). Next, as shown in (e) of FIG. 9, the image selection unit 213 divides each of the image-capturing time sections in (d) of FIG. 9 in half. The image selection unit 213 selects the image having the highest score for a sub-slot, as the third image, from among the images captured in the two image-capturing time sections (the images corresponding to the two image-capturing time sections) from which the first image and the second image are not selected, that is, the image-capturing time sections indicated by the solid lines in (f) of FIG. 9.

Next, the case in which an image cannot be selected because there is no image in an image-capturing time section from which an image is supposed to be selected is explained with the example of selecting the fourth image. In the present embodiment, for selecting an image to be arranged in a double-page spread from a sub-image group, the image-capturing time period of the sub-image group is divided according to the time period regardless of the number of images. Therefore, there is a case in which no image is present in an image-capturing time section that has been obtained as a result of division. For example, it is assumed that, as shown in (g) of FIG. 9, although it is desired that the fourth image is selected from the image-capturing time section from which no image has been selected yet (the image-capturing time section indicated by the diagonal lines), no image is present in the image-capturing time section indicated by the diagonal lines. In this case, the image selection unit 213 divides each of the image-capturing time sections from which an image has already been selected in half, as shown in (h) of FIG. 9. Next, as shown in (i) of FIG. 9, the image selection unit 213 selects the image having the highest score for a sub-slot, as the fourth image, from the images captured in the image-capturing time sections indicated by the solid lines from which any of the first to third images is not selected.

Figure 11:
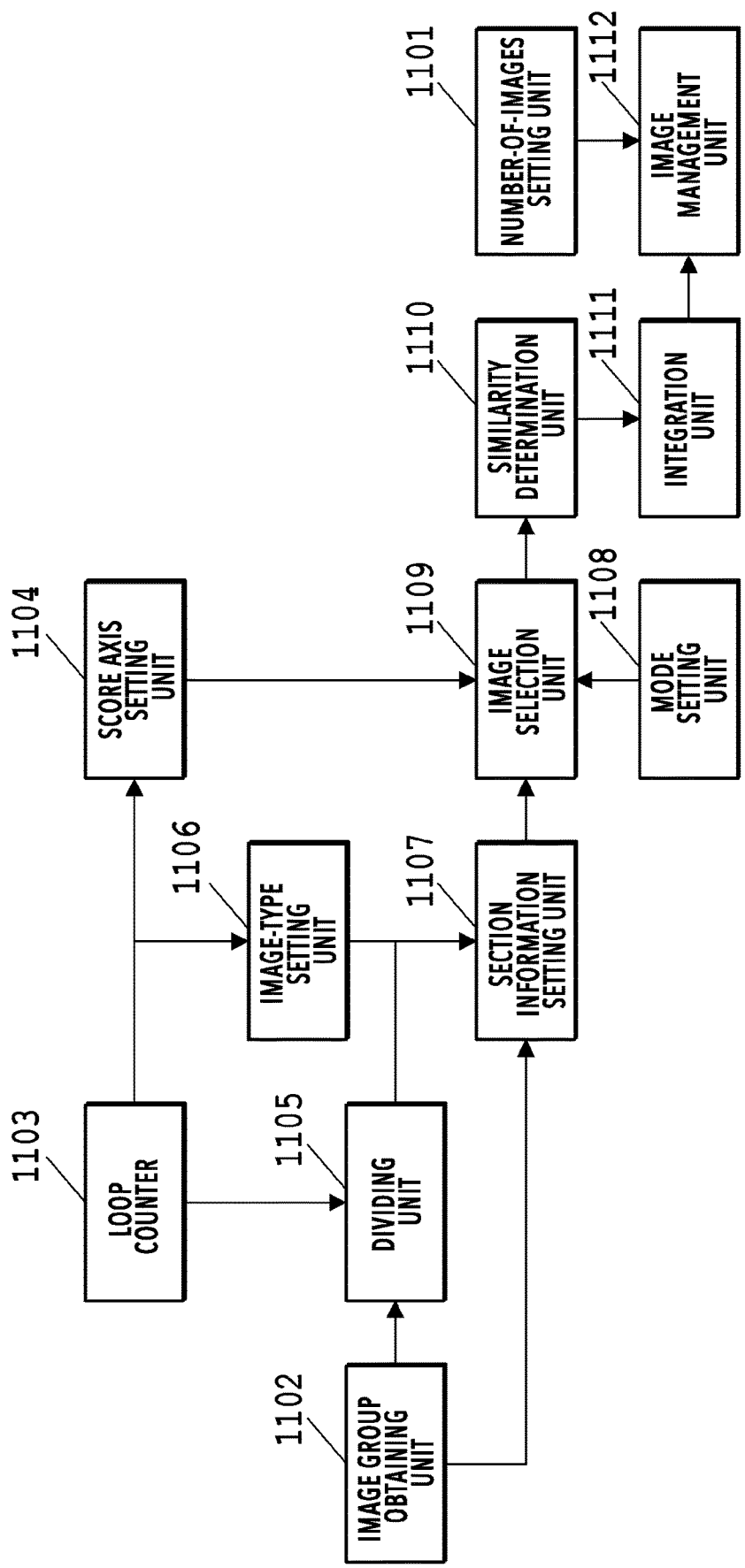
FIG. 11 is a diagram for explaining detailed image selection according to the present invention.

FIG. 11 is a diagram for further explaining the image selection unit 213 shown in FIG. 2 in detail. The image selection unit 213 selects an image from a sub-image group allocated to a given double-page spread.

The number-of-images setting unit 1101 sets the total number of images to be selected from the sub-image group allocated to the processing-target double-page spread. In other words, the total number of images to be arranged in each double-page spread is set.

The image group obtaining unit 1102 obtains a sub-image group allocated to a double-page spread, based on an image group obtained by the image obtaining unit 205 and a scene ID created by the image classification unit 208. At the time of obtaining the image group, the image obtaining unit 205 obtains the image-capturing date and time information, the image type, the object information, the score for a main-slot, the score for a sub-slot of each image. Although the image types are classified into three types, that is, a still image, a cutout image from a moving image, and an SNS image in the present embodiment, the image types are not limited to as such. There may be classification into an image type other than the above-described three types, or there may be further detail classification of a still image, such as a still image captured by a digital camera, a still image captured by a smart device, or the like.

The loop counter 1103 manages the number of times the process of selecting an image to be arranged in a double-page spread from a sub-image group has been executed. Note that the process of selecting an image is executed in the method explained with reference to FIG. 9. The number of times that is managed is utilized for determining a score axis to be used and for setting the number of image-capturing time sections the image-capturing period of the sub-image group allocated to the processing-target double-page spread is divided into.

The score axis setting unit 1104 sets a score axis to be utilized, according to the number of times the process has been performed, which is counted by the loop counter 1103.

"Sets a score axis to be utilized" means "to set references for evaluation of images". Here, the score axis for a main-slot (the references for evaluation for a main-slot) and the score axis for a sub-slot (the references for evaluation for a sub-slot) to be used in the scoring performed in S416 are set. In the present embodiment, the multiple references for evaluation are switched, so that references for evaluation are set for each slot type. Here, for example, the score axis for a main-slot is set for the first time, so as to execute a process of selecting an image for a main-slot, and the score axis for a sub-slot is set for the second and subsequent times, so as to execute a process of selecting an image for a sub-slot.

In the explanation of the present embodiment, the score axis for a main-slot and the score axis for a sub-slot are taken as the examples of a score axis to be utilized. However, another score axis may be used. For example, in addition to the score axis for a main-slot and the score axis for a sub-slot, a score axis for personal relevance degrees may be used. Note that the personal relevance degrees can be scored based on, for example, the number of times a person appears and the number of images taken with the person. Specifically, it is determined that a person who frequently appears has a high degree of relevance with the evaluated sub-image group and that people who are together in a number of images have a high degree of relevance with each other. In addition, although the score axes are switched for scoring in the above explanation, an integrated score axis in which the score axis for a main-slot, the score axis for a sub-slot, the score axis for personal relevance degrees, etc., are combined may be used. In this case, the weight of each score axis may be changed for calculating an integrated score. Furthermore, the score axis to be utilized may be randomly changed every time the process is performed. Alternatively, the score axes may be switched with reference to a table that is prepared in advance.

The dividing unit 1105 divides the image-capturing period of the sub-image group into a predetermined number of sections, based on the image-capturing date and time information obtained by the image analyzing unit 207. First, based on the image-capturing times of the images included in the sub-image group obtained by the image group obtaining unit 1102, the starting time of image-capturing and the ending time of image-capturing of the sub-image group allocated to the processing-target double-page spread are specified, so as to calculate the image-capturing period of the sub-image group. That is, the image-capturing period is calculated by specifying the image-capturing time of the image that was captured at the earliest time and the image-capturing time of the image that was captured at the latest time from among the images included in the sub-image group.

Next, based on the number of times the process has been performed, which is counted by the loop counter 1103, the calculated image-capturing period is equally divided, so as to create image-capturing time sections. The number of image-capturing time sections resulting from division is set as a power of 2 based on the count. Although the method of equally dividing the image-capturing period by a power of 2 based on the count is explained in the present embodiment, the present embodiment is not limited as such, and the image-capturing period may be equally divided by the count number. Furthermore, the dividing unit 1105 outputs the starting time and the ending time of image-capturing of each of the image-capturing time sections resulting from division.

The image-type setting unit 1106 sets the type of image to be selected at the time of image selection, according to the number of times the process has been performed, which is counted by the loop counter 1103. According to the setting in the present embodiment, an image is selected from SNS images for the first time the process is performed, and from cutout images from a moving image for the second time, then from still images for the third and subsequent times.

The section information setting unit 1107 groups the images included in the sub-image group obtained by the image group obtaining unit 1102 into each of the image-capturing time sections resulting from the division by the dividing unit 1105, and the section information setting unit 1107 stores the information about each image-capturing time section, such as the photographic information of an image and the score of each image.

The mode setting unit 1108 performs setting of the mode designated by the album creation condition setting unit 201, so that objects corresponding to the set mode are arranged in the processing that follows. Note that, as described above, examples of the mode include "PEOPLE", "ANIMALS", and "FOODS".

The image selection unit 1109 selects, from each image-capturing time section, one image having a high score and including an object corresponding to the mode. The selection of an image by the image selection unit 1109 is performed based on the score axis that has been set by the score axis setting unit 1104, the mode that has been set by the mode setting unit 1108, and the scores of images that have been set by the section information setting unit 1107. As explained with reference to FIG. 9, an image is not selected from an image-capturing time section including no image. Although one image is selected from each image-capturing time section in the present embodiment, there may be a form in which multiple images are selected from each image-capturing time section. In the present embodiment, it is assumed that the determination condition for the determination of an image including an object corresponding to the set mode is whether an object corresponding to the set mode is included in TOP1 through TOP3 of the object classification of each image at the time of analysis as shown in FIG. 5. However, the present embodiment is not limited as such.

Each time an image is selected from an image-capturing time section, the similarity determination unit 1110 performs a similarity determination on the selected image, compared to the previously selected image. As described later, in a case where the result of the similarity determination is equal to or greater than a judgment threshold value, it is determined that the images are similar, and, in a case where the result is smaller than the judgment threshold value, it is determined that the images are not similar. In a case where it is determined that the images are not similar, the image selected from the section is retained, and, in a case where it is determined that the images are similar, the image selected from the section is discarded.

For the similarity determination, a determination based on pattern matching, a determination by use of the SHIFT method, or the like, can be used. The judgment threshold value used for the similarity determination is changed according to the difference between the image-capturing times of the images to be compared. For example, in a case where the similarity determination result is output in the range of 0 to 100, the similarity is determined to be higher as the similarity determination result is closer to 100. Further, it is determined that the images are similar in a case where the similarity determination result is equal to or greater than the judgment threshold value, and it is determined that the images are not similar in a case where the similarity determination result is smaller than the judgment threshold value. In a case where difference between image-capturing times is short (for example, within 15 seconds) due to continuous shooting, or the like, the judgment threshold value is set low (for example, set to 60). Otherwise, it is desirable to set the judgment threshold value to 80. By lowering the judgment threshold value, it becomes more likely that the images are determined to be similar, and, even with small similarity, the images are determined to be similar images. Therefore, it becomes more likely that a selected image is discarded and images that can be selected run out. In the present embodiment, the judgment standard is changed according to difference between image-capturing times as described above.

The integration unit 1111 sorts out images to be left to the end from the images that have been determined not to be similar by the similarity determination unit 1110 and selected for the respective sections. In a case where images are selected from multiple sections, an image of any of the sections to be sorted out is determined. For determination of images, the same scores as the ones used for determination by the image selection unit 1109 are used, and an image with a high score is selected. Although an image with a high score is selected in the present embodiment, the present embodiment is not limited as such. For example, of the sections from which an image is selected, an image may be selected from a section adjacent to sections from which images are not selected.

The image management unit 1112 adds the image selected by the integration unit 1111 as a selected image, and the image management unit 1112 determines whether the required number of images, which has been set by the number-of-images setting unit 1101, is exceeded or not. In a case where the number of selected images reaches the required number of images, the image selection processing ends. In a case where the number of selected images has not reached the required number of images, the loop counter 1103 counts up, and the image selection processing as described above is executed again.

Here, for the sake of explanation, the explanation has been given of the example in which images including the same object are selected for both of a main-image and a sub-image, it is also possible to select different objects for a main-image and a sub-image. For example, since a main-image is selected in a case where the loop count is 1, it is possible to select different objects for a main-image and a sub-image by switching objects to be selected between the case where the loop count is 1 and the other cases.

FIG. 12 is a diagram of a processing flow for selecting an image to be arranged in a slot of a template from a sub-image group, which is performed by the configuration shown in FIG. 11. An explanation is given of a detailed flow for selecting an image from a sub-image group allocated to a processing-target double-page spread. Note that FIG. 12 is a flowchart for explaining the process of S423 in detail.

In S1201, the number-of-images setting unit 1101 sets the total number of images to be selected from the sub-image group allocated to the processing-target double-page spread. Note that the total number of images may be determined based on the set value of the number-of-double-page-spread-photographs designation bar 309 in FIG. 3, or the total number of images may be a value that is set by default.

In S1202, the image group obtaining unit 1102 obtains image data corresponding to the sub-image group allocated to the processing-target double-page spread from the image data of the image group obtained by the image obtaining unit 205.

In S1203, the mode setting unit 1108 sets a mode. Here, a mode of "PEOPLE", "ANIMALS", or "FOODS" is set, as described above.

In S1204, the loop counter 1103 counts the number of times the process of selecting an image has been executed for each sub-image group. Note that the initial value is 1.

In S1205, the score axis setting unit 1104 sets a score axis to be utilized. In the present embodiment, a score axis to be utilized is set according to the number of times the image selection processing has been performed, which is managed by the loop counter 1103. Note that the specific setting method has been described above in the explanation of the score axis setting unit 1104.

In S1206, the image-type setting unit 1106 sets the image type to be selected. In a case where the loop count is 1, that is, in a case where the number of times the processing has been performed is 1, in the present embodiment, the image type is set such that an SNS image is to be selected. In a case where the loop count is 2, that is, in a case where the number of times the processing has been performed is 2, the image type is set such that a cutout image from a moving image is to be selected. In a case where the loop count is 3 or more, that is, in a case where the number of times the processing has been performed is 3 or more, the image type is set such that a still image is to be selected.

In S1207, the dividing unit 1105 calculates the image-capturing period of the sub-image group allocated to the processing-target double-page spread, based on the starting time and the ending time of the image-capturing times of the sub-image group, so as to equally divide the image-capturing period of the sub-image group into image-capturing time sections, based on the number of times the processing has been performed, which is counted by the loop counter 1103. Note that, since no image has been selected in a case where the number of times the processing has been performed is 1, division is not performed in that stage. In a case where the number of times the processing has been performed is 2, one image has been selected, and the number of image-capturing time sections of the image-capturing period of the sub-image group is 1. Therefore, the entire image-capturing period is equally divided in half, so that two image-capturing time sections are created. In a case where the number of times the processing has been performed is 3, two images have been selected, and the number of image-capturing time sections that are present is 2. Therefore, the two image-capturing time sections are equally divided in half, respectively, so that four image-capturing time sections are created.

In S1208, the section information setting unit 1107 groups the image data of the obtained sub-image group into each image-capturing time section that results from the division, and the section information setting unit 1107 obtains the score and the photographic information of each image of each image-capturing time section.

In S1209, it is determined whether an image of the target image-capturing time section has been selected, wherein the target image-capturing time section has resulted from division by the dividing unit 1105. In a case where an image of the target image-capturing time section has already been selected, the processing proceeds to S1214. In a case where an image of the target image-capturing time section has not been selected yet, the processing proceeds to S1210. Note that, since the image-capturing time section has not been divided in the first loop, the number of target image-capturing time sections is 1.

In S1210, whether an object corresponding to the set mode is included in an image of the target image-capturing time section for which an image has not been selected yet, is determined. For example, in a case where "ANIMALS" is set as the mode, whether there is an image including an object to be identified as an animal or not is determined. In a case where there is no image including a designated object, the processing proceeds to S1214. In a case where there is an image including a designated object, the processing proceeds to S1211.

In S1211, the image selection unit 1109 selects one image including a designated object from the images in the target image-capturing time section. Note that, in a case where there are multiple images including a designated object in the target image-capturing time section, the image having the highest score is selected.

In S1212, the similarity determination unit 1110 performs a similarity determination on the image selected from the target image-capturing time section, compared to the previously selected image, which has been selected from another image-capturing time section. In a case where it is determined that there is no similar image in another image-capturing time section, the image selected from the target image-capturing time section is retained, and the processing proceeds to S1214. In a case where it is determined that there is a similar image in another image-capturing time section, the processing proceeds to S1213, so that selection of the image from the target image-capturing time section is cancelled, and then the processing proceeds to S1214.

In S1214, whether the processing of selecting an image has been executed for all the image-capturing time sections that has resulted from division in S1207 or not is determined. In a case where the processing has been executed for all the image-capturing time sections, the processing proceeds to S1215. In a case where the processing has not been executed for all the image-capturing time sections that have resulted from division in S1207, the processing returns to S1208, so as to select an image for an image-capturing time section for which an image has not been selected.

In S1215, the integration unit 1111 selects the image to be left to the end, which has the highest score, from the images of each image-capturing time section that have been determined not to be similar by the similarity determination unit 1110. That is, in a case where two or more images remain after S1209 through S1214, the image to be left is selected.

In S1216, the image management unit 1112 adds the image selected in S1215 and manages the total number of selected images.

In S1217, whether the total number of selected images, which is managed by the image management unit 1112, matches the required number of images that has been set by the number-of-images setting unit 1101 or not is determined. In a case where the total number of selected images matches the required number of images, the image selection processing ends. In a case where the total number of selected images is less than the required number of images, the processing proceeds to S1218.

In S1218, whether all images including an object corresponding to the designated mode have been selected from the sub-image group or not is determined. In a case where all images including an object corresponding to the designated mode have not been selected and an image including an object corresponding to the designated mode is still present in the sub-image group, the processing returns to S1204, so that the image selection processing is continued until the total number of selected images reaches the required number of images. Upon returning to S1204, the counter managed by the loop counter 1103 counts up by one. As a result, the dividing unit 1105, which operates in synchronization, performs division, so as to set image-capturing time sections twice as many as the sections in the previous loop. Since the image-capturing time sections are further divided and an image is selected for an image-capturing time section for which an image has not been selected, an image that has not been selected is to be selected. In S1218, in a case where all images including an object corresponding to the designated mode have been selected from the sub-image group, the processing proceeds to S1219.

In S1219, the designated mode is changed in a case where, of the images of the sub-image group, there is no image corresponding to the designated mode even after determination is performed for all of the images that have not been selected. As for the changing method, the mode may be changed to the mode in the highest priority other than the designated mode in accordance with a predetermined priority order, or the mode may be changed based on the objects included in the sub-image group. Returning to S1203, the mode is reset to the changed mode, and the processing is repeated until the required number of images can be obtained.

Returning to FIG. 4, in S424, the template setting unit 214 sets multiple templates to be utilized for the layout from the storage device 104. The templates which have the design designated by the album creation condition setting unit 201 are set.

In S425, the image layout unit 215 determines the layout of images of the processing-target double-page spread. From among the multiple templates that are set by the template setting unit 214, a template that is suitable for arranging a selected image is determined. An explanation is given of the method for determining the template with reference to the block diagram shown in FIG. 13, which is for explaining the configuration of the software for determining the template.

The selected-image information obtaining unit 1301 obtains the number of selected images, which have been selected by the image selection unit 213, and image information related to each of the selected images. The image information to be obtained includes the width and height of the image, the image-capturing date and time information, and the score calculated by the image scoring unit 210.

The template selection unit (number of slots) 1302 selects a template candidate having the number of slots that matches the number of selected images from among the templates that have been set by the template setting unit 214.

The selected-image sorting unit 1303 sorts the selected images in order based on the image-capturing dates and times.

From among the templates that have been selected by the template selection unit 1302, the template selection unit (main-image position) 1304 selects a template candidate of which the arrangement order of a main-slot, in which a main-image is arranged, matches the arrangement order of a main-image in a case where the selected images are arranged in order based on the image-capturing dates and times. Next, a template candidate whose main-slot has the same aspect ratio as the main-image is selected. In the present embodiment, it is assumed that an image with an earlier image-capturing date and time is arranged at the upper left of the template and an image with a later image-capturing date and time is arranged at the lower right of the template.

From among the templates that have been selected by the template selection unit (main-image position) 1304, the template selection unit (sub-image position) 1305 selects a template that is suitable for the images that have been selected by the image selection unit 213. The template selection unit (sub-image position) 1305 selects a template whose sub-slots, in which sub-images are arranged, match the orders of the sub-images in a case where the selected images are arranged in order based on the image-capturing dates and times and whose sub-slots have the same aspect ratio as the sub-images.

Figure 14:
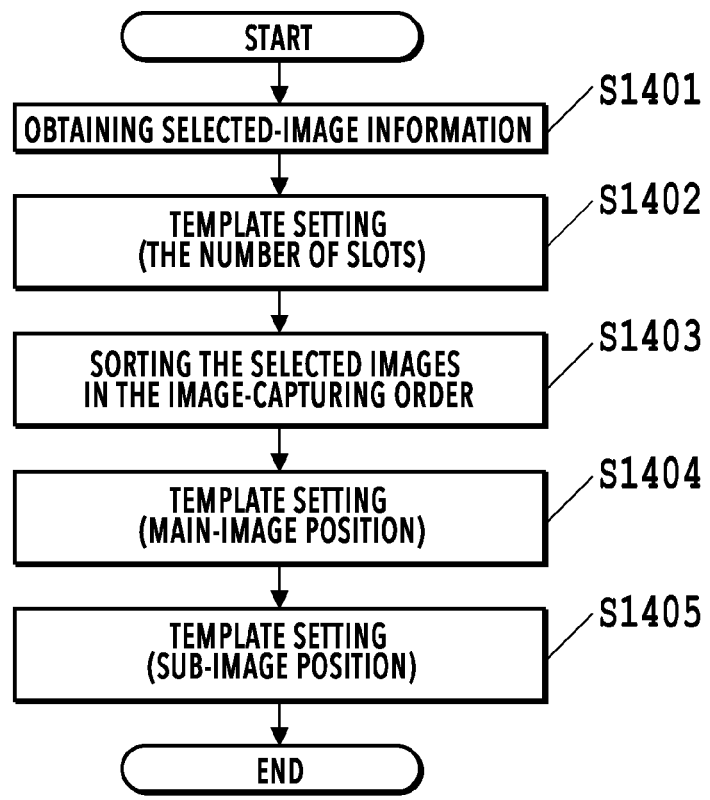
FIG. 14 is a diagram for explaining a detailed flow of image selection according to the present invention.

FIG. 14 is a diagram of a processing flow for determining a template.

In S1401, the selected-image information obtaining unit 1301 obtains the selected number of selected images and the image information of each of the selected images. Here, it is assumed that three images are selected by the processing of FIG. 12. Therefore, 3 is obtained as the number of selected images in S1401.

In S1402, the template selection unit (number of slots) 1302 selects a template candidate of which the number of slots matches the number of selected images. Here, a template having three slots is selected. Note that the templates (1-1) to (4-4) shown in FIG. 10A are examples of a template having three slots.

Figure 10B:
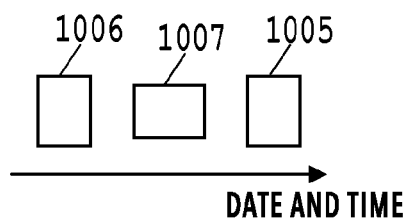
FIG. 10B is a diagram for explaining a layout of images according to the present invention.

In S1403, the selected-image sorting unit 1303 sorts the selected images in order based on the image-capturing times. It is assumed that the result of arranging the selected images in order based on the image-capturing dates and times is as shown in FIG. 10B. Here, it is assumed that the image 1005 is the main-image selected for the main-slot, and the image 1006 and the image 1007 are the sub-images selected for the sub-slots.

In S1404, the template selection unit (main-image position) 1304 selects a template candidate of which the arrangement order of the main-image matches the arrangement order of the main-slot in a case where the selected images are arranged in order based on the image-capturing dates and times and of which the main-slot has the same aspect ratio as the main-image. Since the image 1005 has the latest image-capturing date and time and is a main-image for the main-slot, the templates (3-1) to (3-4) shown in FIG. 10A are selected as the candidates.

In S1405, the template selection unit (sub-image position) 1305 selects a template of which the positions and the aspect ratios of the sub-slots match the sub-images. In the example shown in FIG. 10B, the earlier image 1006 for a sub-slot, that is, the image to be arranged at the upper left is a vertical image, and the later image 1007 is a horizontal image. Therefore, the template (3-2) is selected as the most suitable template for the selected images.

As described above, in S425, the template to be used and information as to which image is to be arranged in which slot of the template are determined.

In S426, the image correction unit 217 performs image correction. In a case where the image correction condition that has been input to the image correction unit 217 is "ON", image correction is performed. In the present embodiment, dodging correction, red-eye correction, and contrast correction are automatically performed as the image correction. In a case where the image correction condition that has been input to the image correction unit 217 is "OFF", image correction is not performed. The image to which the image correction has been performed is converted such that the pixel count on the short side is 1200 pixels and the color space is sRGB.

In S427, the layout information output unit 218 creates layout information. Each image is arranged on the template as determined in S425. Here, the images to be used are scaled and arranged according to the size information of each slot included in the template. The images used here are the corrected images generated in S426 and are different from the analysis images used in S408 through S418. Then, as layout information, the layout information output unit 218 generates bitmap data in which the images are arranged in the template.

In S428, whether S423 through S427 have been completed for all the double-page spreads or not is determined. In a case where S423 through S427 have not been completed ("NO" in S428), the processing returns to S423. In a case where S423 through S427 have been completed ("YES" in S428), the automatic layout process ends.

In this way, an album is created in the above-described flow, and the result is previewed for the user. The user checks the completed album to be previewed, and the user may perform an editing work as necessary.

In the following, an explanation is given of a method for performing an automatic layout to an additional double-page spread or an additional page, which is added to a completed album having existing double-page spreads or existing pages in response to an instruction by the user.

Figure 15:
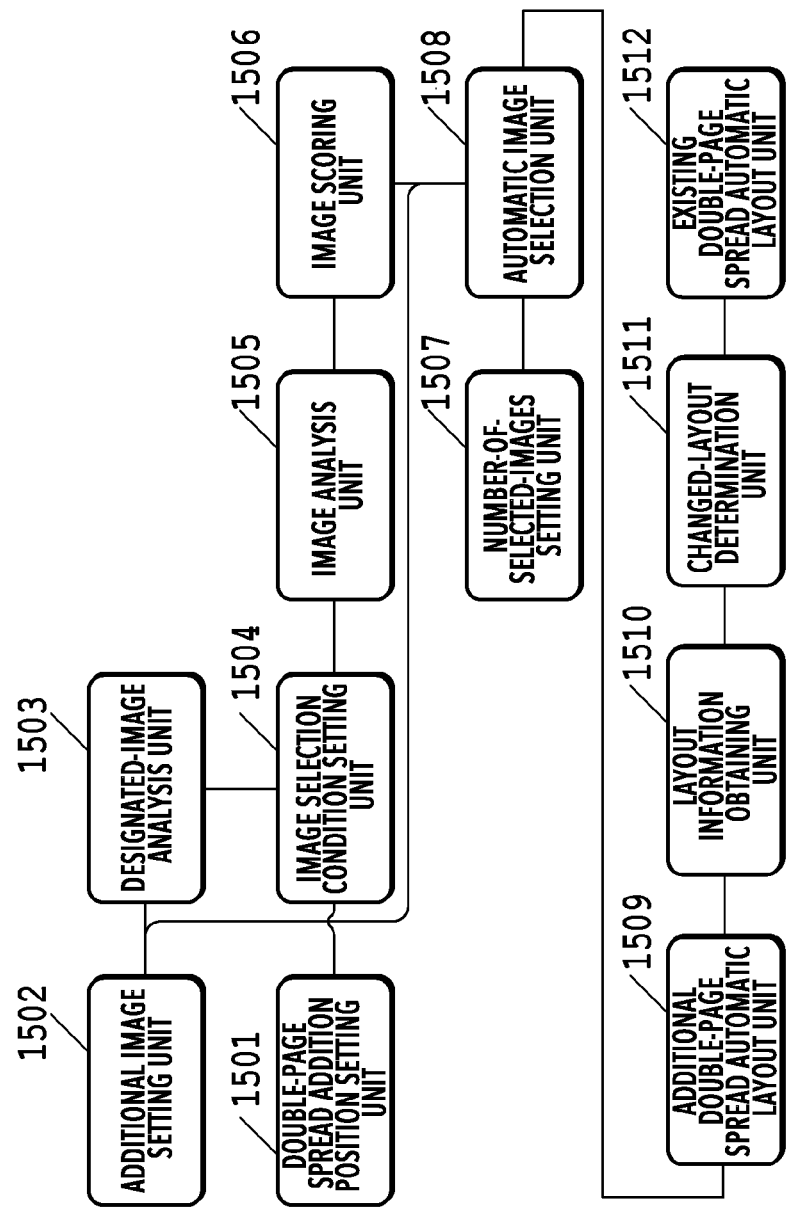
FIG. 15 is a diagram for explaining an automatic layout for an additional page and an existing page according to the present invention.

FIG. 15 is a block diagram for explaining the configuration of software for automatically selecting an image to be used for an additional double-page spread.

The double-page spread addition position setting unit 1501 determines a position for adding a double-page spread to an automatic layout result, based on input by the user. The designation of the double-page spread addition position is explained with reference to FIG. 21.

Figure 21:
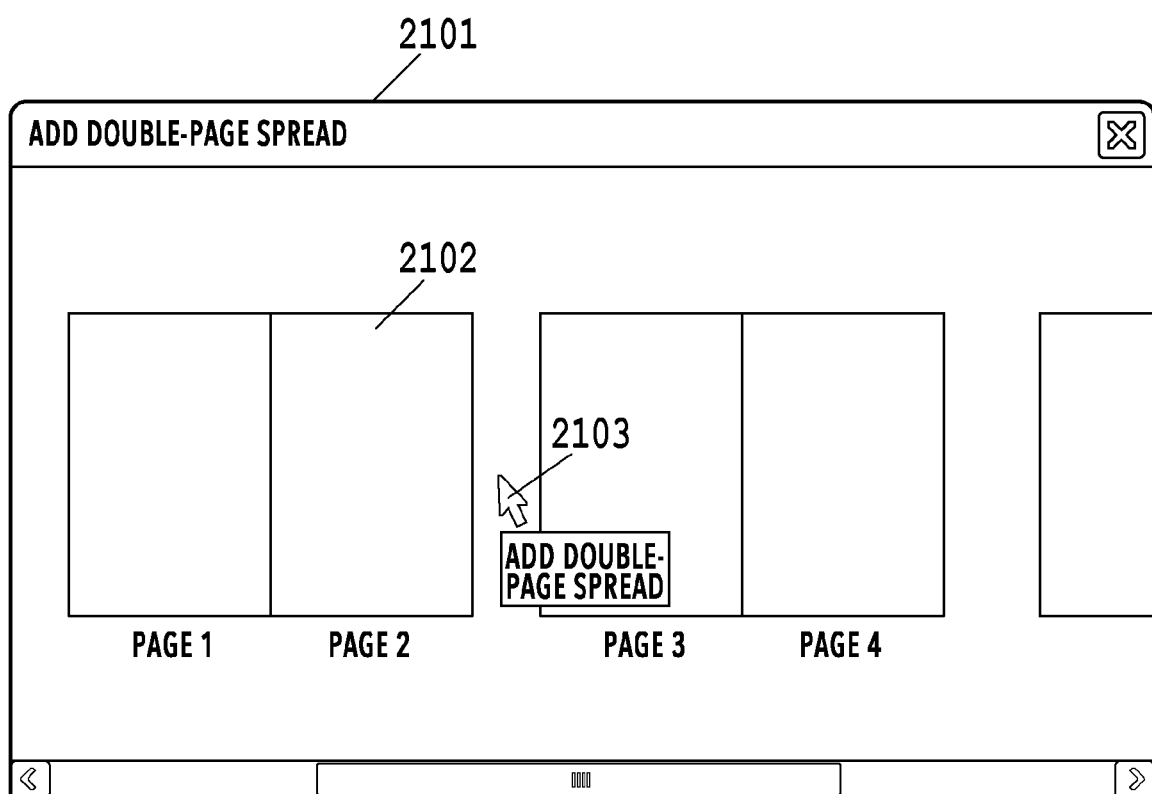
FIG. 21 is a diagram for explaining a method for designating an additional page according to the present invention.

FIG. 21 is a diagram showing an example of a UI for designating a double-page spread addition position in an automatic layout result. The window 2101 is a display window for previewing a result of the automatic layout. By moving the slider bar arranged at the bottom of the display window, all layout results can be checked. The double-page spread 2102 indicates a layout result of each double-page spread created by the automatic layout. The user can designate the position where a double-page spread is added for the automatic layout result using the pointer 2103. In a case where the user moves the pointer 2103 using the mouse 107 to a position where the user would like to add a double-page spread, the pop-up of "ADD DOUBLE-PAGE SPREAD" is displayed. By clicking at the position where the pop-up is displayed, it is possible to determine the position where a double-page spread is added.

The additional image setting unit 1502 presents a group of images that have not been used in the album for the user, so as to allow the user to select an image to be used for the additional double-page spread from the presented group of images. The designation of the image by the user is explained with reference to FIG. 22.

Figure 22:
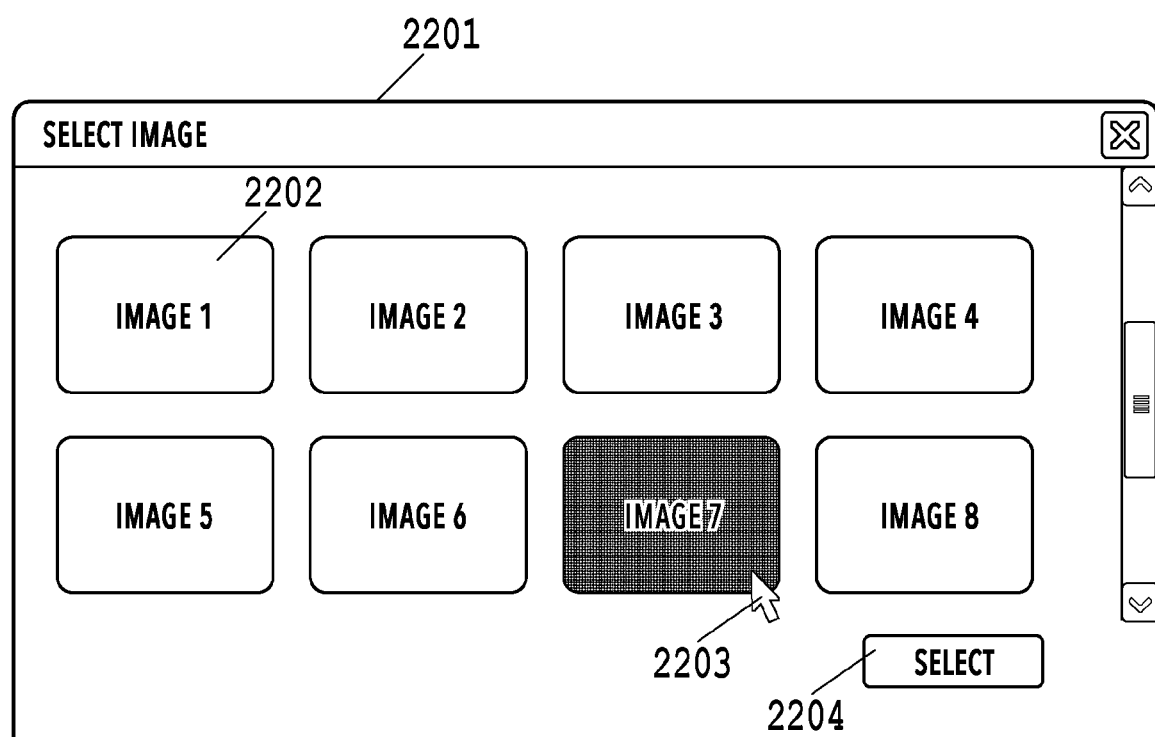
FIG. 22 is a diagram for explaining a method for designating an image to be used for an additional page according to the present invention.

FIG. 22 is a diagram showing an example of a UI for selecting an image to be used for the additional double-page spread. The window 2201 is a display window for displaying a list of images that can be designated. The image 2202 is an image that can be designated. Here, images that have not been selected for the automatic layout are displayed. The user can designate the image to be used for the additional double-page spread using the pointer 2203. The example of FIG. 22 shows a situation where the pointer 2203 is moved onto IMAGE 7 to select IMAGE 7. Multiple images may be selected as the images to be used for the additional double-page spread. The button 2204 is a button for confirming that the selection of the image to be designated has been completed. In a case where the button 2204 is pressed, the selected image is determined as an image to be used for additional double-page spread.

In the explanation herein, for convenience of explanation, it is assumed that the image to be used for the additional double-page spread is selected from the image group included in the directory designated by the album creation condition setting unit 201. However, there may be a form in which the user can designate an image group included in another directory.

Returning to explanation of FIG. 15, the designated-image analysis unit 1503 analyzes the image that has been selected by the user with the additional image setting unit 1502. Here, an explanation is given of the case in which one image is designated by the additional image setting unit 1502. On the designated image, the designated-image analysis unit 1503 performs the same image analysis as the image analysis performed by the image analyzing unit 207. In a case where the analysis has already been performed during the automatic layout, the analysis result is stored. Therefore, by utilizing the analysis result, high speed processing can be achieved since the processing by the designated-image analysis unit 1503 can be omitted. In a case where an image included in a different directory from the images designated by the album creation condition setting unit 201 is designated, there is no analysis result. Therefore, the analysis process is performed by the designated-image analysis unit 1503. As described above, the analysis result includes the results of object determination, face detection, facial expression recognition of a detected face, and personal recognition of a detected face regarding the image data as well as the image-capturing date and time information, etc. Here, for the explanation, the image-capturing date and time information is taken as the example of the analysis result.

The image selection condition setting unit 1504 sets a condition for automatically selecting an image candidate to be used for the additional double-page spread, apart from the image designated by the additional image setting unit 1502. Here, for the sake of explanation, with reference to the image-capturing date and time of the image designated by the additional image setting unit 1502, being classified into the same scene as the image designated by the additional image setting unit 1502 from among the sub-image groups resulting from division by the image classification unit 208 is set as the image selection condition (range). Here, as described above, it is assumed that the image designated by the additional image setting unit 1502 has been selected from an image group included in the directory designated by the album creation condition setting unit 201. Furthermore, scene classification has already been performed on the image groups included in the directory designated by the album creation condition setting unit 201. That is, the image groups have already been divided into sub-image groups, based on the image-capturing dates and times. Therefore, it is possible to specify which sub-image group and which scene the designated image belongs to, based on the image-capturing date and time.

In a case where the image designated by the additional image setting unit 1502 does not include image-capturing date and time information, the image selection condition (range) may be set based on the previous and following double-page spreads of the double-page spread addition position, which has been designated by the double-page spread addition position setting unit 1501. For example, the latest image-capturing date and time of the images used in the previous double-page spread of the additional double-page spread is set as the image-capturing starting date and time. Furthermore, the earliest image-capturing date and time of the images used in the following double-page spread of the additional double-page spread is set as the image-capturing ending date and time. The range between the starting date and time and the ending date and time is set as the image selection condition.

In a case where an image included in a different directory from the image designated by the album creation condition setting unit 201 is designated, it is also possible to set all the images in the different directory as the range of the image selection. Furthermore, it is also possible that the images in the different directory are similarly analyzed and divided into image groups as with the image classification unit 208 for scene classification, so that only the images classified into the same scene as the image designated by the additional image setting unit 1502 are set as the range of the image selection.

The image analysis unit 1505 obtains an image that satisfies the image selection condition that has been set by the image selection condition setting unit 1504, except for the image designated by the additional image setting unit 1502, and performs a similar analysis process as with the image analyzing unit 207. In a case where the image analysis has been performed in advance and the analysis result is stored, it is possible to utilize the stored analysis result. In a case where the result is not stored, the analysis process is performed.

The image scoring unit 1506 scores the image obtained by the image analysis unit 1505, based on the image analysis result. For scoring the image, a similar process as with the image scoring unit 210 is performed. In a case where the score of the image has been calculated in advance and the result is stored, it is possible to utilize the stored result. In a case where the score of the image is not stored, the score of the image is calculated, based on the analysis result.

The number-of-selected-images setting unit 1507 sets the number of images to be arranged in the additional double-page spread and the number of automatically selected images, which is the number of images obtained by subtracting the number of images designated by the additional image setting unit 1502 from the number of images to be arranged in the additional double-page spread. Here, the average number of images per double-page spread is calculated based on the number of images used in each double-page spread at the time of the automatic layout, and the average number of images is set as the number of images to be arranged in the additional double-page spread. Furthermore, the number of images obtained by subtracting the number of images designated by the additional image setting unit 1502 from the average number of images is set as the number of automatically selected images to be used from among the images obtained based on the image selection condition.

Here, the number of images obtained by subtracting the number of images designated by the user from the average number of images is set as the number of automatically selected images. However, the minimum value and the maximum value may be set for the images to be arranged. For example, as the number of images to be arranged in the additional double-page spread, it is possible to set the minimum value by searching for the minimum number of images in the double-page spreads in the album and to set the maximum value by similarly searching for the maximum number of images in the double-page spreads in the album. Instead of the number of images adopted in the album, it is also possible to set fixed values as the minimum value and the maximum value of the number of images to be arranged in the additional double-page spread. Furthermore, the minimum value and the maximum value may be set according to the number of images that can be arranged in the held templates. Also, the number of automatically selected images may be set according to the number of unused images included in the range that has been set by the image selection condition setting unit 1504. For example, in a case where the number of unused images is lower than the average number of images or the minimum value as described above, the number of unused images may be set as the number of automatically selected images.

The automatic image selection unit 1508 selects an image to be arranged in the additional double-page spread from among the images obtained based on the image selection condition, in addition to the images designated by the user with the additional image setting unit 1502. By performing a similar image determination in which a group of unused images included in the range that has been set by the image selection condition setting unit 1504 is compared with the image that has been designated by the user, images that are not similar are selected in descending order from the image with the highest score according to the number of automatically selected images that has been set by the number-of-selected-images setting unit 1507. In a case where the number of unused images included in the range that has been set by the image selection condition setting unit 1504 is small, the threshold value that is set for the similar image determination can be changed according to the number of unused images. For example, at the time of selection, the selection may be performed by the same processing as with the image selection unit 213 by use of image-capturing date and time information.

Figure 13:
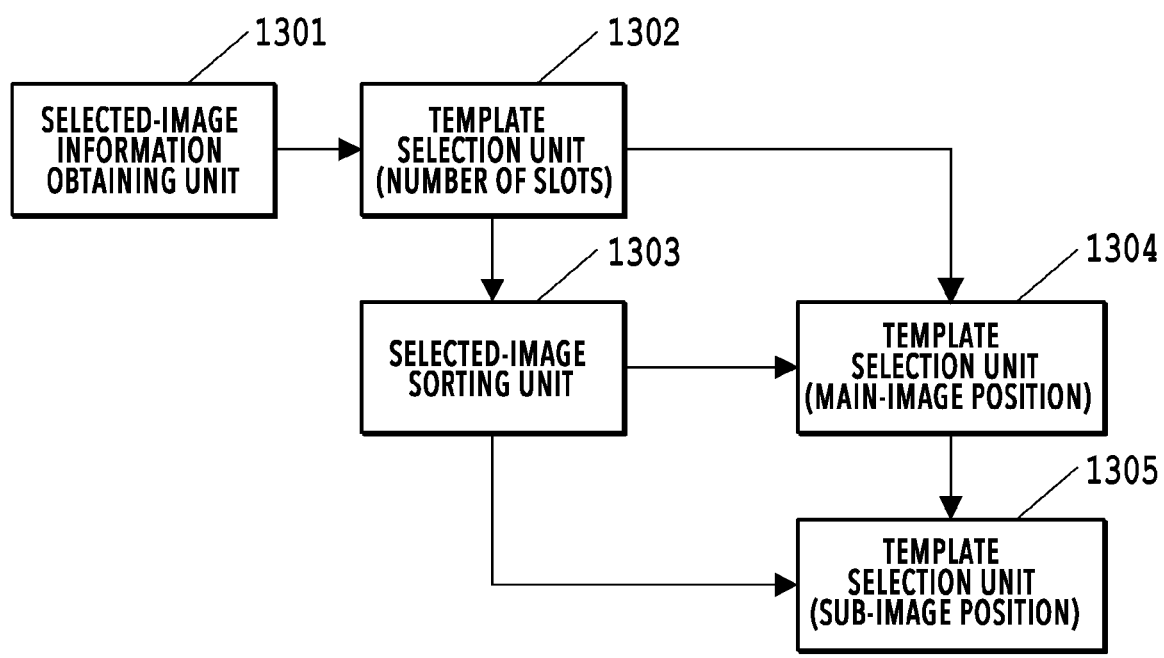
FIG. 13 is a diagram for explaining detailed image selection according to the present invention.

The additional double-page spread automatic layout unit 1509 performs an automatic layout for the additional double-page spread with the image that has been set by the additional image setting unit 1502 and the image that has been automatically selected by the automatic image selection unit 1508. Here, for the sake of explanation, the same processing as the layout method performed by the image layout unit 215 described in FIG. 2 and the template determination method explained with reference to FIG. 13 and FIG. 14 are performed for the automatic layout process.

Although the explanation here has been given with the case in which the same layout method as the automatic layout of the entire album is used for the additional double-page spread, another layout method may be used. Furthermore, the template may be dynamically generated based on the aspect ratio of the selected image, the chronological order, the position of a large slot, etc. Moreover, without using a template, the arrangement of an image, such as the position and the size of the image in a double-page spread, may be set based on the selected image. Note that, in the present disclosure, it is assumed that the arrangement of an image means the position of the outer rim of the image, the position of each side constituting the outer rim, or the position of each vertex.

The layout information obtaining unit 1510 obtains layout information of the layout result created by the additional double-page spread automatic layout unit 1509. The layout information includes the template that is used, the background color, the background pattern, a setting of a margin, a feature amount of an arranged image, an arrangement order of images according to the image-capturing dates and times, an image arranged in a large slot, etc. The layout information obtaining unit 1510 obtains the above-described layout information related to the additional double-page spread.

The changed-layout determination unit 1511 determines whether or not to change the layout of an existing double-page spread to which layout has already been performed, other than the additional double-page spread. Furthermore, the changed-layout determination unit 1511 sets a portion to be changed in the existing double-page spread and the method for changing the layout, based on the layout information of the additional double-page spread, which has been obtained by the layout information obtaining unit 1510.

Here, for the sake of explanation, whether the layout results are similar or not is determined for the previous double-page spread and the following double-page spread adjacent to the additional double-page spread. As the method for determining whether the layout results are similar or not, the number of slots, the sizes of the slots, the positions of the slots of respective sizes in the templates adopted for the previous double-page spread and the following double-page spread adjacent to the additional double-page spread are compared for determining the similarity. As another method for determining whether the layout results are similar or not, it is possible to assign a number to each template, so that the layout results are determined to be similar in a case where the same number is assigned to the templates that are used.

The changed-layout determination unit 1511 compares the template used for the layout of the additional double-page spread and the template used for the layout of an existing double-page spread that is adjacent to the additional double-page spread. Here, for the sake of explanation, it is assumed that a similar template is used for the layout of the existing double-page spread positioned immediately previous to the additional double-page spread.

In a case where it is determined that similar templates are used, it is determined that a changed layout is necessary for the existing double-page spread, which is determined to be using the similar template, so that another template other than the template in use is utilized for the existing double-page spread.

Here, for the sake of explanation, the determination process is performed to the double-page spread adjacent to the additional double-page spread. However, it is also possible to perform the determination process to a double-page spread that is not adjacent to the additional double-page spread. As the reference for setting the determination target, an existing double-page spread in which an image of the same scene as an image used in the additional double-page spread is used may be set as the determination target, for example.

The existing double-page spread automatic layout unit 1512 provides a changed layout to the existing double-page spread for which it is determined by the changed-layout determination unit 1511 that a changed layout is necessary. Based on the changing method that has been set by the changed-layout determination unit 1511, an automatic layout is performed to the existing double-page spread for which a changed layout is to be provided. Here, for the sake of explanation, the method of changing the template to be used is taken as an example.

For the automatic layout process, the same processing as the layout method performed by the image layout unit 215 described in FIG. 2 and the template determination method explained with reference to FIG. 13 and FIG. 14 are performed. Here, according to control based on a determination result of the changed-layout determination unit 1511, an image is arranged by use of a template other than the template that has been determined to be similar. Specifically, by the template determination method explained with reference to FIG. 13 and FIG. 14, the template used for the layout of the additional double-page spread is excluded from the template candidates. As a result, a layout result by use of another template can be automatically created. In addition, for performing an automatic layout of an additional double-page spread, it is also possible to prepare another template set that is different from the template set used for the automatic layout of an existing double-page spread. Furthermore, by utilizing another template set to be used for an automatic layout of an additional double-page spread at the time of providing a changed layout to an existing double-page spread as well, it is possible to reduce the effect to the existing double-page spreads for which a changed layout is not provided.

Here, for the sake of explanation, the additional double-page spread automatic layout unit 1509 and the existing double-page spread automatic layout unit 1512 are described as different configurations. However, the additional double-page spread automatic layout unit 1509 and the existing double-page spread automatic layout unit 1512 may be realized as one configuration.

Furthermore, although the explanation has been given of the method for changing the layout of an existing double-page spread, it is also possible to change or add an image to be utilized for the layout of an existing double-page spread. For example, in a case where an image that is similar to the image used for an existing double-page spread is used for an additional double-page spread, it is possible to change the image used for the existing double-page spread, which is similar to the image used in the additional double-page spread, to an image that is not similar.

The above is the explanation of the block diagram for performing the automatic layout to an additional double-page spread and an existing double-page spread.

Figure 23A:
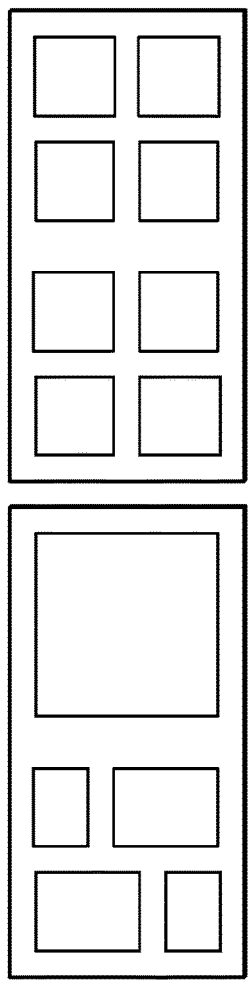
FIG. 23A is a diagram for explaining layout results according to the present invention.
Figure 23B:
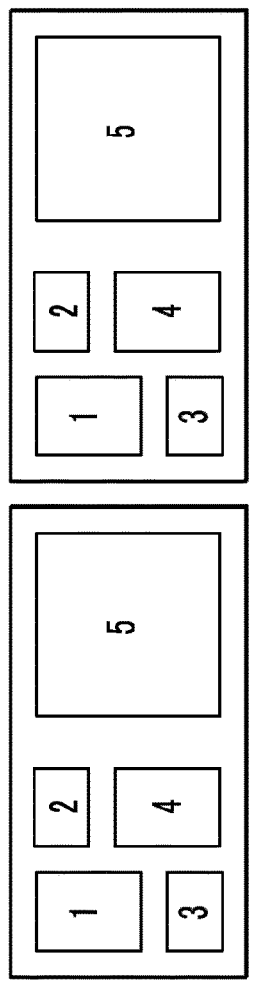
FIG. 23B is a diagram for explaining layout results according to the present invention.
Figure 23C:
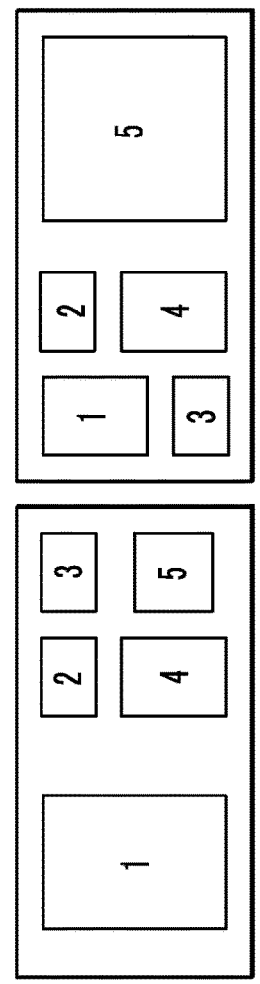
FIG. 23C is a diagram for explaining layout results according to the present invention.

FIGS. 23A through 23C are diagrams for explaining layout results obtained by performing an automatic layout to an additional double-page spread and an existing double-page spread. FIG. 23A shows double-page spreads after performing an automatic layout and before adding a double-page spread. The rectangles in the double-page spreads indicate the arranged images. FIG. 23B shows layout results after a double-page spread is added by the additional double-page spread automatic layout unit 1509 to an addition position designated by the user. In a case where a double-page spread is added to an existing album, a part of the components of the album becomes continuous in such a way as the same template is used for the additional double-page spread, which is added, and for the N double-page spread, which is adjacent to the additional double-page spread. This may result in deterioration in the aesthetic appeal of the layout because of the monotonous impression, etc. In order to avoid such continuity of similar double-page spreads, the layout result of the additional double-page spread is obtained by the layout information obtaining unit 1510 and whether the layout of the existing double-page spread is changed or not is determined by the changed-layout determination unit 1511. In such a case as shown in FIG. 23B, the templates used for the N double-page spread and the additional double-page spread are determined to be the same, and therefore the arrangement of the images in the layout of the existing double-page spread is changed. FIG. 23C shows a result of changing the layout of the existing double-page spread by the existing double-page spread automatic layout unit 1512. Here, for the sake of explanation, a result in which such a template that does not change the chronological order is selected and the arrangement of the images in the existing double-page spread is changed is shown. By adjusting the layout of the existing double-page spread in the above way, it is possible to avoid the aesthetic appeal of the entire album from being deteriorated because of continuity of elements in the configuration of the double-page spreads.

Figure 16:
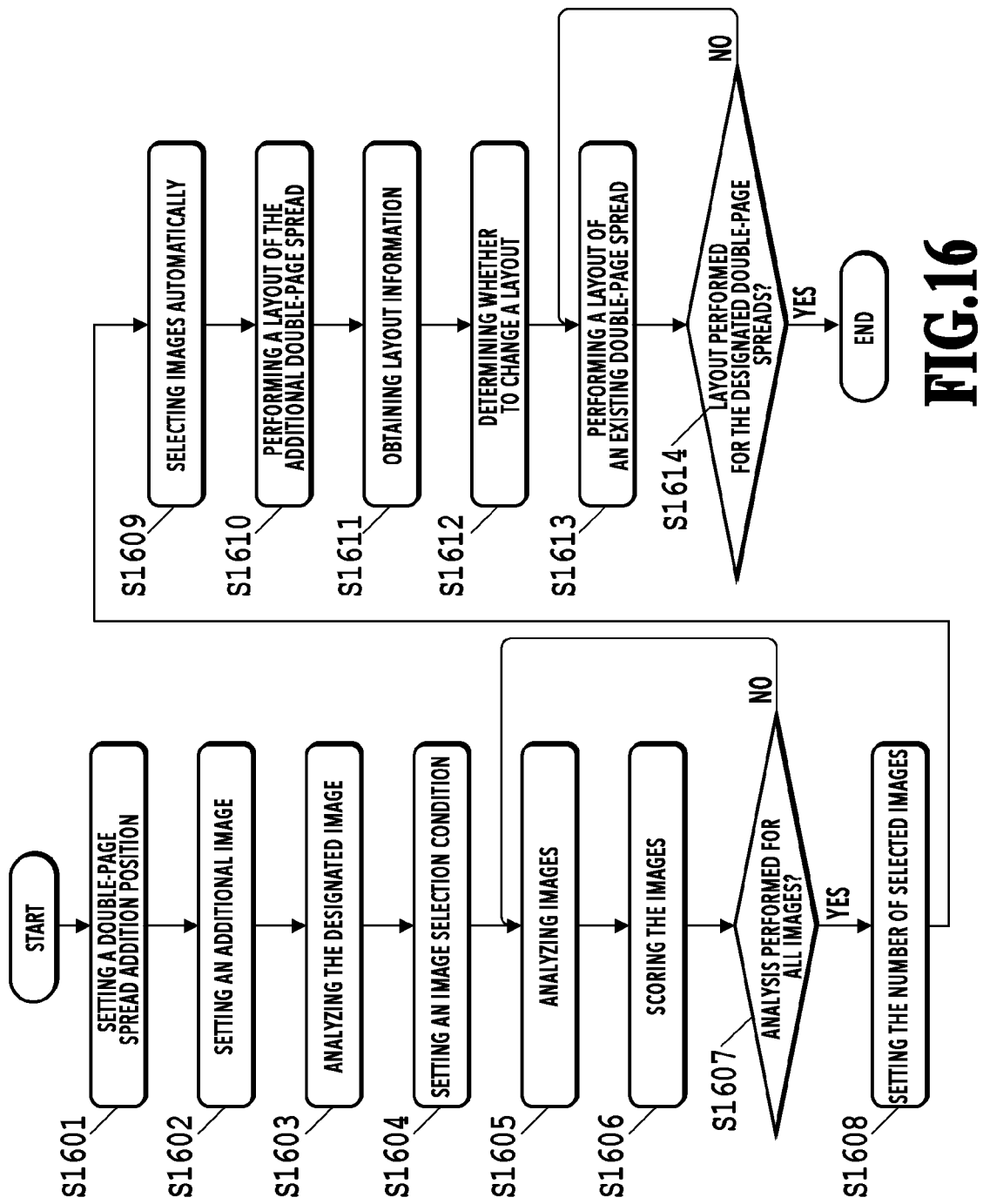
FIG. 16 is a diagram for explaining a flow of an automatic layout for an additional page and an existing page according to the present invention.

FIG. 16 is a flowchart for performing an automatic layout for an additional double-page spread and an existing double-page spread.

In S1601, the double-page spread addition position setting unit 1501 sets the double-page spread addition position, which has been designated by the user with a pointer on the preview of an automatic layout result.

In S1602, the additional image setting unit 1502 presents images that are not used in the album for the user, so as to allow the user to select an image to be arranged in the additional double-page spread from the presented image group. Then, the additional image setting unit 1502 sets the image designated by the user as the user selection image to be arranged in the additional double-page spread.

In S1603, the designated-image analysis unit 1503 analyzes the image that has been set by the additional image setting unit 1502. The designated-image analysis unit 1503 performs the same analysis process as with the image analyzing unit 207.

In S1604, based on the analysis result of the image that has been set by the additional image setting unit 1502, the image selection condition setting unit 1504 sets a condition for automatically selecting an image candidate to be arranged in the additional double-page spread, other than the image that have been set by the additional image setting unit 1502. The condition to be set here is, for example, being classified into the same scene as the image that has been set by the additional image setting unit 1502.

In S1605, the image analysis unit 1505 sequentially analyzes images corresponding to the condition that has been set by the image selection condition setting unit 1504. The image analysis unit 1505 performs the same analysis process as with the image analyzing unit 207.

In S1606, the image scoring unit 1506 scores the images, based on the image analysis results of the image analysis unit 1505. The image scoring unit 1506 performs the same scoring process as with the image scoring unit 210.

In S1607, whether the images corresponding to the condition that has been set by the image selection condition setting unit 1504 have been analyzed and scored or not is determined. In a case where all of the images corresponding to the designated condition have been analyzed and scored, the processing proceeds to S1608. In a case where there is any remaining image that has not been analyzed and scored, the processing returns to S1605, so that the processing is continued for the image that has not been analyzed and scored.

In S1608, the number-of-selected-images setting unit 1507 sets the number of images to be arranged in the additional double-page spread and the number of automatically selected images, which is the number of images to be used from among the images obtained based on the image selection condition. Note that the specific method for setting has been described above in the explanation of the number-of-selected-images setting unit 1507. Therefore, the explanation thereof is omitted.

In S1609, the automatic image selection unit 1508 selects images to be arranged in the additional double-page spread from among images obtained based on the image selection condition in descending order from the image having the highest score, in addition to one or more images that has been set by the additional image setting unit 1502.

In S1610, the additional double-page spread automatic layout unit 1509 performs an automatic layout for the additional double-page spread by use of the images that have been automatically selected by the automatic image selection unit 1508.

In S1611, the layout information obtaining unit 1510 obtains information of the layout result of the additional double-page spread, which has been created by the additional double-page spread automatic layout unit 1509.

In S1612, the changed-layout determination unit 1511 compares the layout result of the additional double-page spread with the layout result of an existing double-page spread (not the additional double-page spread), for which a layout has already been performed, so as to determine whether to change the layout of the existing double-page spread. Note that the specific method for setting has been described above in the explanation of the changed-layout determination unit 1511. Therefore, the explanation thereof is omitted.

In S1613, the existing double-page spread automatic layout unit 1512 provides a changed layout to the existing double-page spread for which it is determined by the changed-layout determination unit 1511 that a changed layout is necessary. For example, the existing double-page spread automatic layout unit 1512 executes S1613 by changing the template used in the existing double-page spread to another template. As another method, S1613 may be implemented by changing a slot size or performing a trimming process.

In S1614, whether an automatic layout has been performed to all of the existing double-page spreads which have been determined to be changed by the changed-layout determination unit 1511 or not is determined. In a case where an automatic layout has been performed to all of the existing double-page spreads, the processing ends. In a case where an automatic layout has not been performed to all of the existing double-page spreads, the processing returns to S1613, so as to process the double-page spreads for which a layout has not been performed.

The above is the explanation of the flowchart for performing an automatic layout to an additional double-page spread and an existing double-page spread.

Note that, in S1612, the layout result of the additional double-page spread is compared with the layout result of an existing double-page spread (not the additional double-page spread), for which a layout has already been performed, so as to determine whether the layout results are similar or not. Then, the layout of the existing double-page spread is determined to be changed in a case where it is determined that the layout results are similar. However, the determination may be made with another reference. For example, in S1612, the layout result of the additional double-page spread is compared with the layout result of an existing double-page spread (not the additional double-page spread), for which a layout has already been performed, so as to determine whether the layout results are similar or not. Then, the layout of the existing double-page spread is determined to be changed in a case where it is determined that the layout results are not similar. In this case, the layout of the existing page is changed to a layout that is similar to the additional page. For example, the layout of the existing page is changed by applying the same template as the additional page to the existing page as well.

In the present embodiment, in a case where an additional double-page spread is added to a specific position of the album, the layout of an existing double-page spread is changed according to the layout of the additional double-page spread, so that a well-balanced album with high aesthetic appeal can be automatically created even after the addition of the double-page spread.

Embodiment 2

In Embodiment 2, a method for integrally performing an automatic layout to an additional double-page spread and an existing double-page spread is described.

Figure 17:
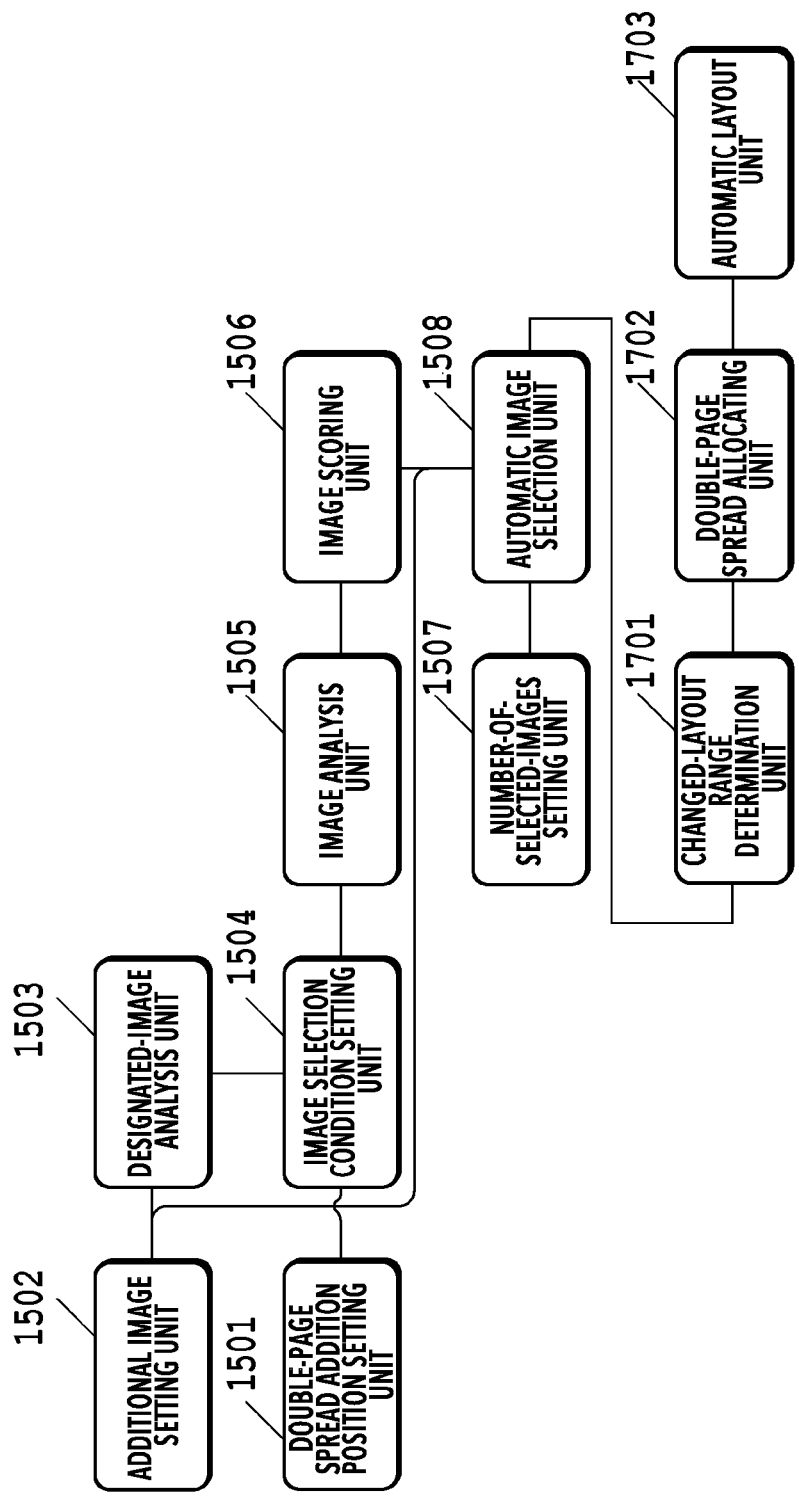
FIG. 17 is a diagram for explaining an automatic layout for an additional page and an existing page according to the present invention.

FIG. 17 is a block diagram for integrally performing an automatic layout to an additional double-page spread and an existing double-page spread. The same reference numerals as those in FIG. 15 represent the same devices that perform the same processing. Therefore, the explanations thereof are omitted here.

The number-of-selected-images setting unit 1507 sets the number of images to be arranged in the additional double-page spread. Here, the minimum number of images in the existing double-page spreads in the album is searched, so as to set the minimum value of the number of images to be arranged in the additional double-page spread.

The changed-layout range determination unit 1701 is a device for determining a range of existing double-page spreads whose layout is to be changed, based on the image that has been set by the additional image setting unit 1502 and the images that have been selected by the automatic image selection unit 1508. Here, the changed-layout range is determined based on whether or not there is an overlap between the image-capturing date and time information of the images arranged in an existing double-page spread and the image-capturing date and time information of the image that has been set by the additional image setting unit 1502 and the images that have been selected by the automatic image selection unit 1508. For example, an explanation is given with an example of the case in which an image to be arranged in an additional double-page spread is selected from a group of unused images included in the same scene as with the images arranged in the existing double-page spread that is immediately previous to the additional double-page spread. In this case, the images arranged in the existing double-page spread and the image to be arranged in the additional double-page spread are images of the same scene. Therefore, it is preferable that the images are consistently arranged in a predetermined order throughout the existing double-page spread and the additional double-page spread, such as in the order based on the image-capturing dates and times. However, the image selected to be used in the additional double-page spread is not necessarily captured later than the image-capturing dates and times of all the images arranged in the existing double-page spread that is immediately previous to the additional double-page spread. Therefore, it is necessary to change the allocation of the images to the existing double-page spread and the additional double-page spread to generate a layout in which the images are newly allocated to the existing double-page spread and the additional double-page spread.

In addition, in a case where there are a small number of unused images in the range that has been set by the image selection condition setting unit 1504 at the time of selecting an image by the automatic image selection unit 1508, there is a possibility that images cannot be selected in accordance with the number of images that has been set by the number-of-selected-images setting unit 1507. Furthermore, even though the number of unused images is equal to or more than the set number of images, in a case where the unused images are not suitable for use in the layout due to bad image quality, or the like, there is a possibility that images cannot be selected in accordance with the set number of images. In such a case as described above, one of the conceivable methods is to select the images arranged in the existing double-page spread as the images to be arranged in the additional double-page spread and then perform an automatic layout to the existing double-page spread, from which the images are moved for the additional double-page spread, at the same time of performing an automatic layout to the additional double-page spread. In a case where images are moved from an existing double-page spread for an additional double-page spread, it is necessary to change the arrangement of the images in the existing double-page spread. Therefore, in such a case, the changed-layout range determination unit 1701 sets the existing double-page spread from which the images are moved for the additional double-page spread as the changing range.

The double-page spread allocating unit 1702 allocates an image to be arranged for the existing double-page spread and the additional double-page spread, which have been determined by the changed-layout range determination unit 1701. Here, the double-page spread to which each image is allocated is set based on difference between image-capturing times of images. First, the image group to be arranged in the additional double-page spread and the existing double-page spreads within the changing range is divided into sections at the point where difference in the image-capturing times is largest. Next, division into sections is performed at the point where difference in the image-capturing times is largest in each section that results from the division. This is repeated until the image group is divided for the required number of double-page spreads, which is the number of double-page spreads including the additional double-page spread and the existing double-page spreads within the changing range. Then, the images are allocated to the respective double-page spreads within the changing range on a per section basis. Here, not just by difference in image-capturing times, the division position may be adjusted so that the number of images included in each section resulting from division becomes the average number of images. Furthermore, in a case where a number of images are moved from an existing double-page spread for an additional double-page spread while there are a small number of unused images or the unused images are not suitable for the layout, it is possible to change the configuration of the existing double-page spreads in such a way as decreasing the number of existing double-page spreads.

The automatic layout unit 1703 performs an automatic layout for each double-page spread to the double-page spreads determined by the changed-layout range determination unit 1701, by use of the images allocated by the double-page spread allocating unit 1702 to the respective double-page spreads. The layout method performed by the automatic layout unit 1703 is the same as the method described in Embodiment 1.

The above is the explanation of the block diagram for integrally performing an automatic layout to an additional double-page spread and an existing double-page spread.

Figure 24A:
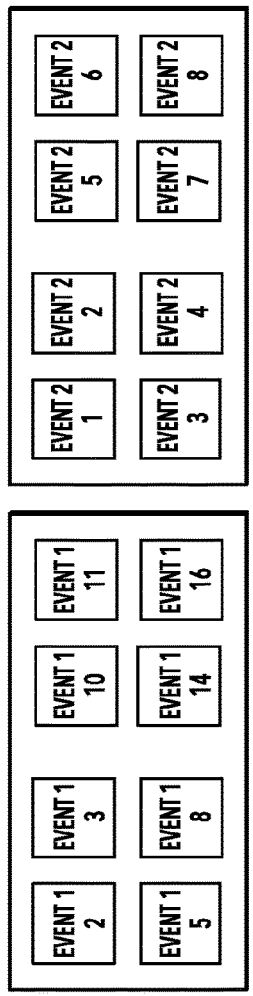
FIG. 24A is a diagram for explaining layout results according to the present invention.
Figure 24B:
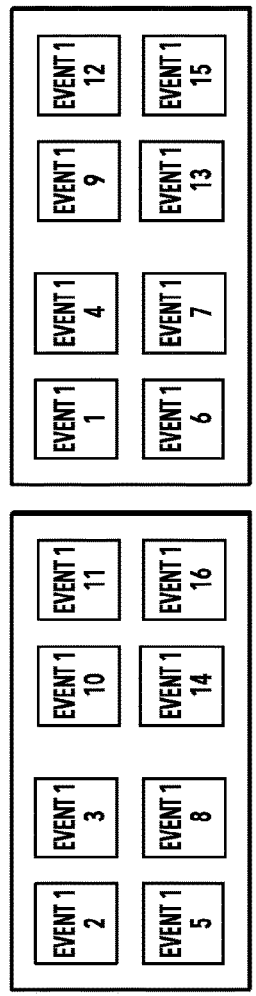
FIG. 24B is a diagram for explaining layout results according to the present invention.
Figure 24C:
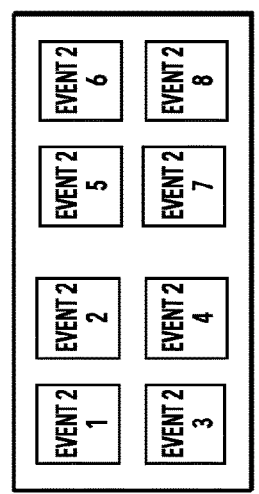
FIG. 24C is a diagram for explaining layout results according to the present invention.

FIGS. 24A through 24C are diagrams for explaining layout results obtained by integrally performing an automatic layout to an additional double-page spread and an existing double-page spread. FIG. 24A shows existing double-page spreads after performing an automatic layout and before adding a double-page spread. The rectangles in the double-page spreads indicate the arranged images. Here, for the sake of explanation, it is assumed that all images have the same aspect ratio. "Event" described in each image indicates the event of the image. The numerical value described under each "Event" is an ID, which schematically represents the order based on the image-capturing date and time. Skipped numbers mean that there is an image that is captured in between but is not adopted as an image to be arranged in a double-page spread. FIG. 24B shows a layout result of performing an automatic layout only within an additional double-page spread, which has been added to the position designated by the user. The images of the same "Event 1" are arranged in the additional double-page spread and the N double-page spread that is adjacent to the additional double-page spread. However, the chronological order is misaligned throughout the N double-page spread and the additional double-page spread. On the other hand, FIG. 24C shows a layout result processed in the present embodiment. The changing range of existing double-page spreads is specified by the changed-layout range determination unit 1701, so that double-page spread allocation including the existing double-page spread is performed by the double-page spread allocating unit 1702. Thereafter, the automatic layout unit 1703 performs an automatic layout to each double-page spread, so as to obtain a layout in which the chronological order is aligned throughout the existing double-page spread to the additional double-page spread.

Figure 18:
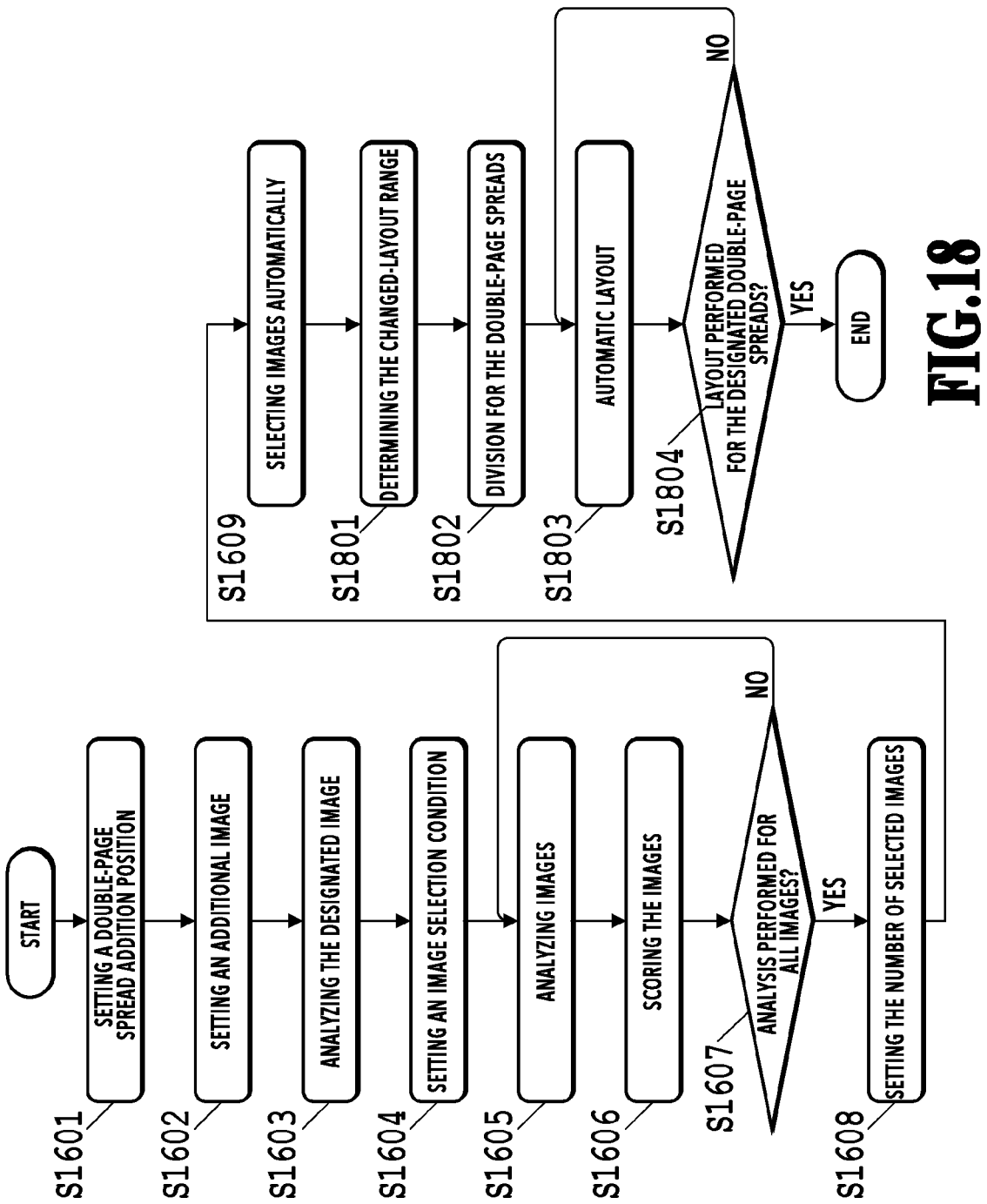
FIG. 18 is a diagram for explaining a flow of an automatic layout for an additional page and an existing page according to the present invention.

FIG. 18 is a flowchart for integrally performing an automatic layout to an additional double-page spread and an existing double-page spread. The same reference numerals as those in FIG. 16 represent the same steps in which the same processing is performed. Therefore, the explanations thereof are omitted here.

In S1801, the changed-layout range determination unit 1701 determines the range of existing double-page spreads whose layout is to be changed, based on the images that have been selected by the automatic image selection unit 1508. For example, in FIG. 24B, the image-capturing date and time information of the images arranged in the N double-page spread overlaps with the image-capturing date and time information of the images arranged in the additional double-page spread. On the other hand, it is assumed that the image-capturing date and time information of the images arranged in the N+1 double-page spread does not overlap with the image-capturing date and time information of the images arranged in the additional double-page spread. In this case, in S1801, the N double-page spread is specified as the range for changing the layouts of the existing double-page spreads.

In S1802, the double-page spread allocating unit 1702 divides the image group which had been arranged in the existing double-page spread that has been determined by the changed-layout range determination unit 1701 as a double-page spread to be changed and the image group selected for the additional double-page spread into the sections corresponding to the number of double-page spreads to be changed based on the image-capturing dates and times. Then, the double-page spread allocating unit 1702 allocates the images to the respective double-page spreads to be changed on a per divided section basis. For example, since the targets are the N double-page spread and the additional double-page spread in the example of FIG. 24B, the image groups are divided for two sections.

In S1803, the automatic layout unit 1703 performs an automatic layout for each double-page spread to the double-page spreads within the changing range, by use of the images allocated by the double-page spread allocating unit 1702 to the respective double-page spreads. In FIG. 24C, an automatic layout is executed for the N double-page spread and the additional double-page spread.

In S1804, whether an automatic layout has been performed to all of the double-page spreads that are determined by the changed-layout range determination unit 1701 or not is determined. In a case where an automatic layout has been performed to all of the double-page spreads, the processing ends. In a case where an automatic layout has not been performed to all of the double-page spreads, the processing returns to S1803, so as to continue processing the double-page spreads for which an automatic layout has not been performed.

The above is the explanation of the flowchart for integrally performing an automatic layout to an additional double-page spread and an existing double-page spread.

In the present embodiment, the existing double-page spreads and the additional double-page spread to which images are allocated are changed, and an automatic layout is performed to an existing double-page spread and an additional double-page spread including images whose allocation to a double-page spread has been changed. Accordingly, it is possible to implement a layout with high consistency between an existing double-page spread and an additional double-page spread.

Embodiment 3

In the Embodiment 3, a method for switching whether double-page spread allocation is performed or not at the time of integrally performing an automatic layout to an additional double-page spread and an existing double-page spread is described.

Figure 19:
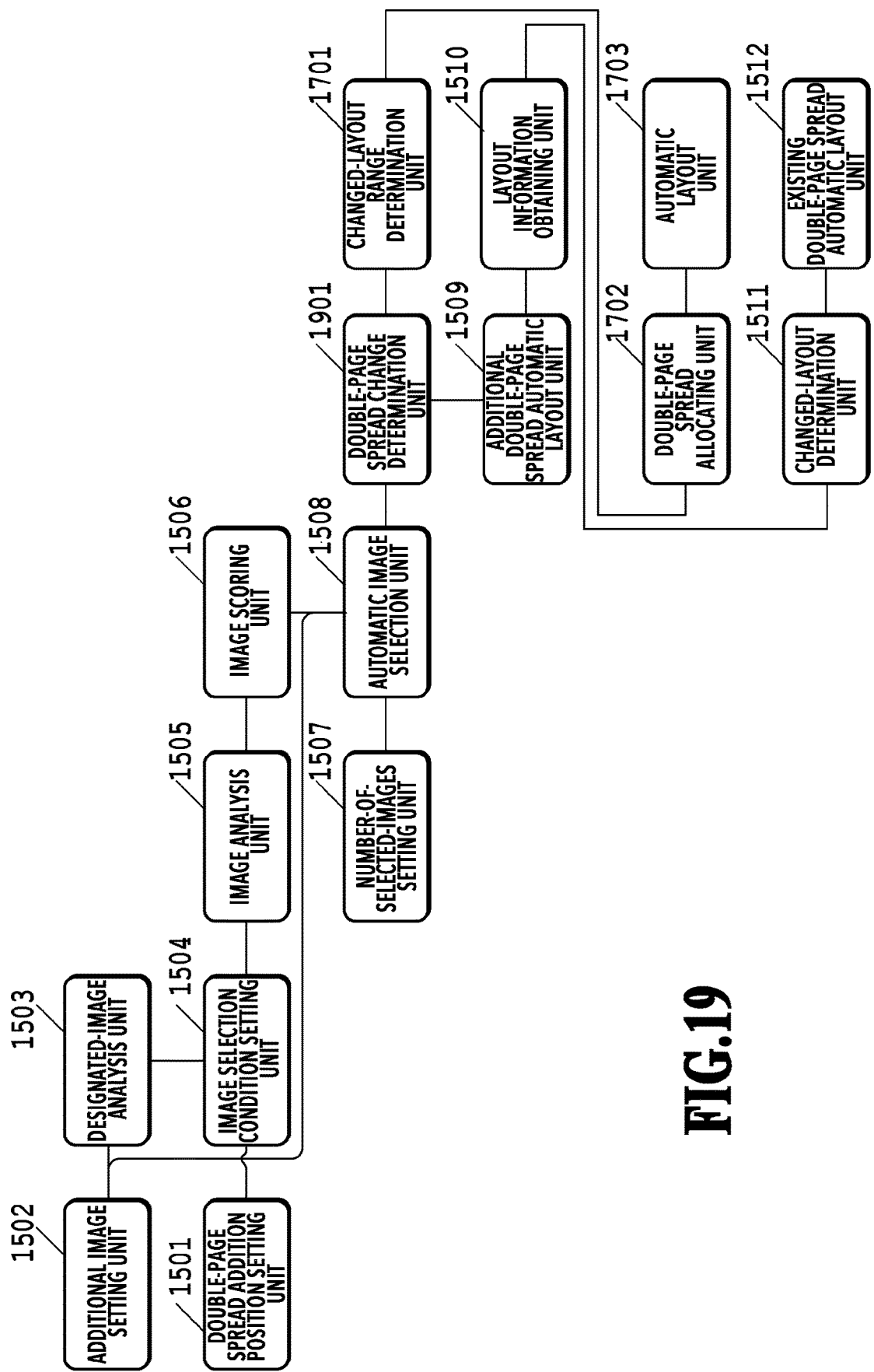
FIG. 19 is a diagram for explaining an automatic layout for an additional page and an existing page according to the present invention.

FIG. 19 is a block diagram for switching whether double-page spread allocation is performed or not at the time of integrally performing an automatic layout to an additional double-page spread and an existing double-page spread. The same reference numerals as those in FIG. 17 represent the same devices that perform the same processing. Therefore, the explanations thereof are omitted here.

The double-page spread change determination unit 1901 determines whether or not to change the allocation to double-page spreads at the time of performing an automatic layout to an additional double-page spread. Here, for the sake of explanation, as for the previous and following double-page spreads adjacent to the additional double-page spread, whether the image-capturing times of the images that have been selected for the additional double-page spread fall in the image-capturing time sections of the images arranged in the existing double-page spreads or not is determined. In a case where the image-capturing dates and times of the images that have been selected for the additional double-page spread do not fall in the image-capturing time sections corresponding to the existing double-page spreads, the allocation to the double-page spreads is not changed. On the other hand, in a case where the image-capturing dates and times of the images that have been selected for the additional double-page spread fall in the image-capturing time sections corresponding to the existing double-page spreads, the allocation to the double-page spreads is changed.

In a case where the allocation to the double-page spreads is not changed, the additional double-page spread automatic layout unit 1509 performs an automatic layout for the additional double-page spread by use of the images that have been selected by the automatic image selection unit 1508 in the procedure explained in Embodiment 1. Then, the layouts of the existing double-page spreads are appropriately changed by the layout information obtaining unit 1510, the changed-layout determination unit 1511, and the existing double-page spread automatic layout unit 1512.

In a case where the allocation to the double-page spreads is changed, an automatic layout is performed for the additional double-page spread and the existing double-page spreads within the changing range by the changed-layout range determination unit 1701, the double-page spread allocating unit 1702, and the automatic layout unit 1703 in the procedure explained in Embodiment 2.

Although the determination of changed double-page spreads is limited to the adjacent double-page spreads for the sake of explanation above, the targets of the determination may be other than the adjacent existing double-page spreads. For example, in a case of an existing double-page spread including an image of a related event, which has a feature in common with an image that has been selected for an additional double-page spread, that existing double-page spread may be included in the target of the determination of the range of changed layouts.

In addition, if allocation to double-page spreads is divided at a point where difference in image-capturing times is large in a case of changing allocation to double-page spreads, there is a possibility that the number of images from the average number of images becomes large. In such a case, the double-page spreads may be divided so that the numbers of images become close to the average number of images, instead of dividing at such a point where the difference in the image-capturing times is large. In a case where the number of images per a double-page spread is higher than the average number of images, it is possible to cancel selection of images in ascending order from the image with the lowest score from among the images that have been selected by the automatic image selection unit 1508 up to the average number of images. In a case where the number of images per a double-page spread is lower than the average number of images, it is possible to additionally select images within the allocated image-capturing time section.

The above is the explanation of the block diagram for switching whether double-page spread allocation is performed or not at the time of integrally performing an automatic layout to an additional double-page spread and an existing double-page spread.

Next, an explanation is given of a flow for switching whether double-page spread allocation is performed or not at the time of integrally performing an automatic layout to an additional double-page spread and an existing double-page spread.

Figure 20:
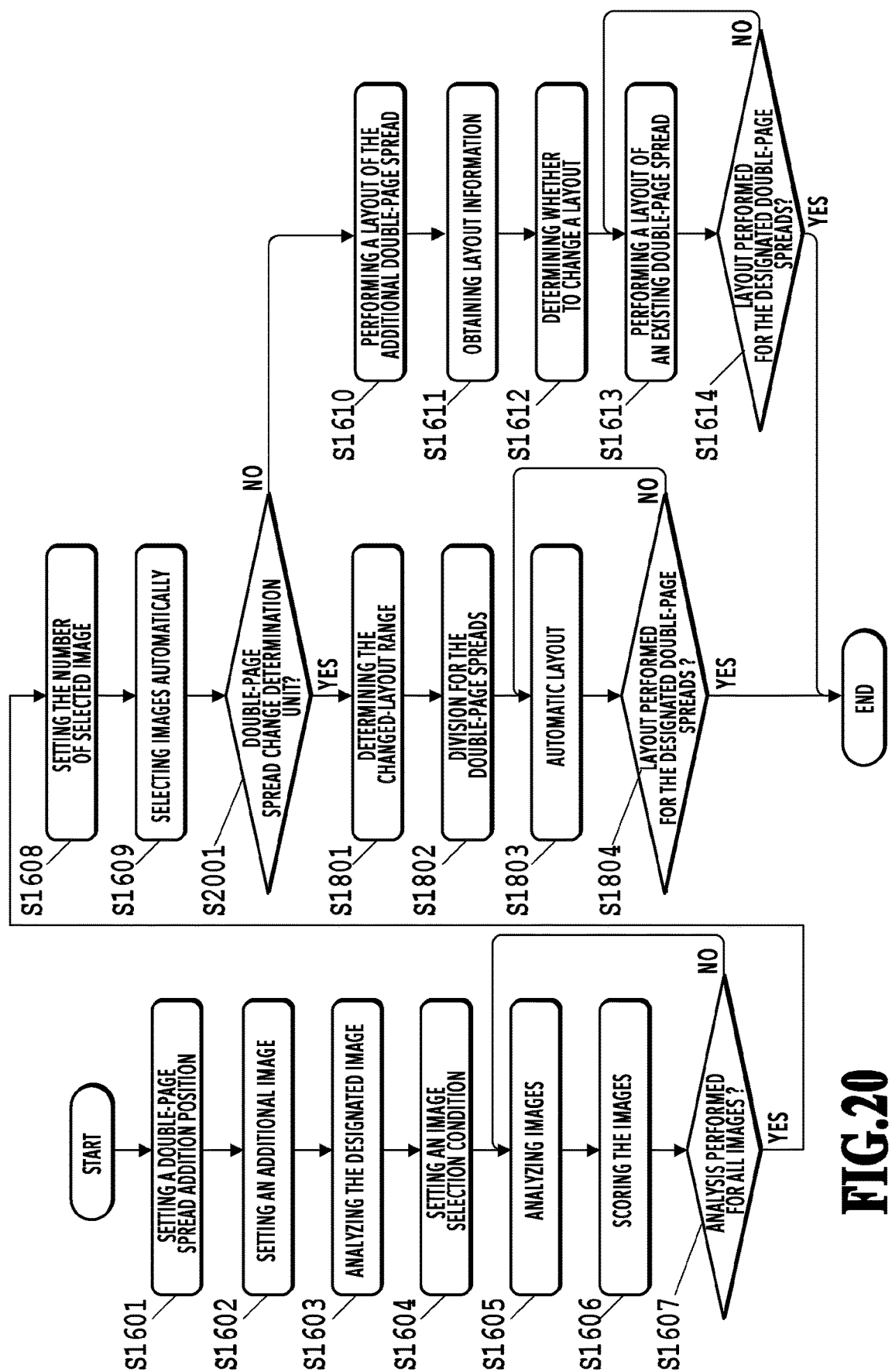
FIG. 20 is a diagram for explaining a flow of an automatic layout for an additional page and an existing page according to the present invention.

FIG. 20 is a flowchart for switching whether double-page spread allocation is performed or not at the time of integrally performing an automatic layout to an additional double-page spread and an existing double-page spread. The same reference numerals as those in FIG. 18 represent the same steps that perform the same processing. Therefore, the explanations thereof are omitted here.

In S2001, the double-page spread change determination unit 1901 determines whether or not to change the allocation of the images to double-page spreads at the time of performing an automatic layout to the additional double-page spread. In a case where the allocation to the double-page spreads is not changed as a result of the determination, the processing branches to execute the process of S1610. In a case where the allocation to the double-page spreads is changed, the processing branches to execute the process of S1801.

By executing an automatic layout in each branch, it is possible to execute an automatic layout for double-page spreads including the additional double-page spread.

The above is the explanation of the flow for switching whether double-page spread allocation is performed or not at the time of integrally performing an automatic layout to an additional double-page spread and an existing double-page spread.

In the present embodiment, by switching whether double-page spread allocation is performed or not, an optimal layout can be implemented according to the images to be arranged.

Other Embodiments

The present invention is not limited to the above-described embodiments. For example, although the album creation application is taken as an example for the explanation in the above-described embodiment, an image processing apparatus or an application provided with image selection processing for automatically selecting a recommended image may be used.

Furthermore, although it is assumed that the image processing apparatus is in a local environment in the example of FIG. 1 for explanation, the environment for the image processing apparatus is not limited as such. For example, an image processing apparatus on a server may be used. In this case, an image stored in the server may be utilized or an image may be uploaded to the server.

Although it is assumed that the images are photographs and the images are grouped based on the image-capturing dates and times in the above-described embodiments, the grouping may be performed based on the dates and times for creating the images.

Although it is assumed that the user designates a mode and the arrangement is performed based on the designated mode in the above-described embodiments, it is also possible to perform image analysis to an image group for creating an album, so as to automatically set a mode, based on the distribution of the types of objects included in the image group, or the like.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

According to the technology of the present disclosure, it is possible to obtain a layout result as desired by the user.

This application claims the benefit of Japanese Patent Application No. 2019-078785 filed Apr. 17, 2019, which is hereby incorporated by reference herein in its entirety.

What is claimed is:

1. An image processing apparatus comprising:
at least one processor configured to:
(1) display layout data including an existing page in which a plurality of image data are arranged;
(2) display an item indicating a position where an additional page is to be added;
(3) add, in the layout data, the additional page to the position indicated by the item, in accordance with operation of the item;
(4) display image data candidates arrangeable in the additional page after the item is operated;
(5) layout image data selected from the displayed image data candidates for the additional page; and
(6) if a layout of at least one of existing pages positioned immediately previous to and following the additional page matches a layout of the additional page, then change the layout of the at least one of existing pages positioned immediately previous to and following the additional page to a layout that is different from the layout of the additional page, so that the layout of the additional page does not match the layout of existing pages positioned immediately previous to and following the additional page.

2. The image processing apparatus according to claim 1, wherein the at least one processor is further configured to change the arrangement of the plurality of image data in the existing page in a case where the number of image data to be arranged in a template used for the additional page is the same as the number of the plurality of image data in the existing page.

3. The image processing apparatus according to claim 1, wherein the processor is further configured to set an addition position where the additional page is added in the layout data, based on an input from the user, and
wherein the existing page is within a range of a predetermined number of pages from the addition position.

4. The image processing apparatus according to claim 1, wherein the existing page includes image data having a predetermined feature in common with image data arranged in the additional page.

5. The image processing apparatus according to claim 1, wherein the additional page is added on a per double-page spread basis, the double-page spread including two pages facing each other in an opened state.

6. The image processing apparatus according to claim 1, wherein the layout data is used for printing an album including a double-page spread.

7. An image processing method comprising:
displaying layout data including an existing page in which a plurality of image data are arranged;
displaying an item indicating a position where an additional page is to be added;
adding, in the layout data, the additional page to the position indicated by the item, in accordance with operation of the item;
displaying image data candidates arrangeable in the additional page after the item is operated;
performing layout processing for laying out image data selected from the displayed image data candidates for the additional page; and if a layout of at least one of existing pages positioned immediately previous to and following the additional page matches a layout of the additional page, changing the layout of the at least one of existing pages positioned immediately previous to and following the additional page to a layout that is different from the layout of the additional page, so that the layout of the additional page does not match the layout of existing pages positioned immediately previous to and following the additional page.

8. The image processing method according to claim 7, wherein the arrangement of the plurality of image data in the existing page is changed in a case where the number of image data to be arranged in a template used for the additional page is the same as the number of the plurality of image data in the existing page.

9. The image processing method according to claim 7, further comprising setting an addition position where the additional page is added in the layout data, based on an input from the user, wherein the existing page is within a range of a predetermined number of pages from the addition position.

10. The image processing method according to claim 7, wherein the existing page includes image data having a predetermined feature in common with image data arranged in the additional page.

11. The image processing method according to claim 7, wherein the additional page is added on a per double-page spread basis, the double-page spread including two pages facing each other in an opened state.

12. The image processing method according to claim 7, wherein the layout data is used for printing an album including a double-page spread.

13. A non-transitory computer-readable storage medium storing a program that causes a computer to perform a method, the method comprising:

displaying layout data including an existing page in which a plurality of image data are arranged;

displaying an item indicating a position where an additional page is to be added;

adding, in the layout data, the additional page to the position indicated by the item, in accordance with operation of the item;

displaying image data candidates arrangeable in the additional page after the item is operated;

performing layout processing for laying out image data selected from the displayed image data candidates for the additional page; and if a layout of at least one of existing pages positioned immediately previous to and following the additional page matches a layout of the additional page, changing the layout of the at least one of existing pages positioned immediately previous to and following the additional page to a layout that is different from the layout of the additional page, so that the layout of the additional page does not match the layout of existing pages positioned immediately previous to and following the additional page.

14. The non-transitory computer-readable storage medium according to claim 13, wherein the layout data is used for printing an album including a double-page spread.

* * * * *